(12) United States Patent
Berduque et al.

(10) Patent No.: US 12,188,893 B2
(45) Date of Patent: Jan. 7, 2025

(54) ELECTROCHEMICAL SENSOR, AND A METHOD OF FORMING AN ELECTROCHEMICAL SENSOR

(71) Applicant: Analog Devices International Unlimited Company, Limerick (IE)

(72) Inventors: Alfonso Berduque, Crusheen (IE); Helen Berney, Limerick (IE); William Allan Lane, Waterfall (IE); Raymond J. Speer, Dalkey (IE); Brendan Cawley, Patrickswell (IE); Donal McAuliffe, Raheen (IE); Patrick Martin McGuinness, Pallaskenry (IE)

(73) Assignee: Analog Devices International Unlimited Company, Limerick (IE)

( * ) Notice: Subject to any disclaimer, the term of this patent is extended or adjusted under 35 U.S.C. 154(b) by 47 days.

(21) Appl. No.: 17/585,332

(22) Filed: Jan. 26, 2022

(65) Prior Publication Data

US 2022/0146449 A1    May 12, 2022

Related U.S. Application Data

(60) Division of application No. 16/329,664, filed as application No. PCT/EP2017/071669 on Aug. 29, (Continued)

(51) Int. Cl.
*G01N 27/407*    (2006.01)
*G01N 27/30*    (2006.01)

(52) U.S. Cl.
CPC ......... *G01N 27/407* (2013.01); *G01N 27/304* (2013.01)

(58) Field of Classification Search
CPC . G01N 27/407; G01N 27/304; G01N 27/4045
See application file for complete search history.

(56) References Cited

U.S. PATENT DOCUMENTS 3,942,517 A    3/1976    Bowles
4,014,345 A    3/1977    Kameny
(Continued)

FOREIGN PATENT DOCUMENTS

CN    102466654 B    3/2014
CN    103663362 A    3/2014
(Continued)

OTHER PUBLICATIONS

"European Application Serial No. 17797863.2, Communication Pursuant to Article 94(3) EPC mailed Nov. 2, 2022", 4 pgs.
(Continued)

*Primary Examiner* — Luan V Van
*Assistant Examiner* — Shizhi Qian
(74) *Attorney, Agent, or Firm* — Schwegman Lundberg & Woessner, P.A.

(57) ABSTRACT

An electrochemical sensor is provided which may be formed using micromachining techniques commonly used in the manufacture of integrated circuits. This is achieved by forming microcapillaries in a silicon substrate and forming an opening in an insulating layer to allow environmental gases to reach through to the top side of the substrate. A porous electrode is printed on the top side of the insulating layer such that the electrode is formed in the opening in the insulating layer. The sensor also comprises at least one additional electrode. The electrolyte is then formed on top of the electrodes. A cap is formed over the electrodes and electrolyte. This arrangement may easily be produced using micromachining techniques.

13 Claims, 18 Drawing Sheets

Related U.S. Application Data 2017, now Pat. No. 11,268,927, which is a continuation-in-part of application No. 15/251,833, filed on Aug. 30, 2016, now Pat. No. 10,620,151.

(56) References Cited

U.S. PATENT DOCUMENTS

| | | |
|---|---|---|
| 4,102,331 A | 7/1978 | Grayzel et al. |
| 4,132,616 A | 1/1979 | Tantram et al. |
| 4,169,779 A | 10/1979 | Tataria et al. |
| 4,184,937 A | 1/1980 | Tataria et al. |
| 4,474,648 A | 10/1984 | Tantram et al. |
| 4,492,622 A | 1/1985 | Kuypers |
| 4,595,486 A | 6/1986 | Schmidt et al. |
| 4,739,380 A | 4/1988 | Lauks et al. |
| 4,765,864 A | 8/1988 | Holland et al. |
| 4,784,720 A | 11/1988 | Douglas |
| 4,812,221 A * | 3/1989 | Madou ............... G01N 27/4045 414/415 |
| 4,855,017 A | 8/1989 | Douglas |
| 4,874,499 A | 10/1989 | Smith et al. |
| 4,874,500 A | 10/1989 | Madou et al. |
| 4,900,405 A | 2/1990 | Otagawa et al. |
| 4,925,544 A | 5/1990 | Goldring |
| 5,149,281 A | 9/1992 | Hills et al. |
| 5,215,643 A * | 6/1993 | Kusanagi ............ G01N 27/4045 204/426 |
| 5,217,595 A | 6/1993 | Smith et al. |
| 5,284,566 A | 2/1994 | Cuomo et al. |
| 5,304,293 A * | 4/1994 | Tierney ............... G01N 27/4045 204/414 |
| 5,331,310 A | 7/1994 | Stetter et al. |
| 5,358,619 A | 10/1994 | Suzuki |
| 5,376,255 A | 12/1994 | Gumbrecht et al. |
| 5,378,343 A | 1/1995 | Kounaves et al. |
| 5,501,893 A | 3/1996 | Laermer et al. |
| 5,521,101 A | 5/1996 | Saini et al. |
| 5,575,930 A | 11/1996 | Tietje-girault et al. |
| 5,650,054 A | 7/1997 | Shen et al. |
| 5,746,899 A | 5/1998 | Finbow et al. |
| 5,840,255 A | 11/1998 | Kappel et al. |
| 6,168,948 B1 | 1/2001 | Anderson et al. |
| 6,265,750 B1 | 7/2001 | Feng et al. |
| 6,509,195 B1 | 1/2003 | De et al. |
| 6,663,756 B2 | 12/2003 | Lee et al. |
| 6,695,959 B2 | 2/2004 | Kiesele |
| 6,853,258 B2 | 2/2005 | Toliver et al. |
| 6,948,352 B2 | 9/2005 | Rabbett et al. |
| 7,077,938 B1 | 7/2006 | Austen et al. |
| 7,279,080 B2 | 10/2007 | Chapples et al. |
| 7,498,266 B2 | 3/2009 | Richter et al. |
| 7,534,333 B2 | 5/2009 | Khalafpour |
| 7,767,068 B2 | 8/2010 | Lauks et al. |
| 8,266,795 B2 | 9/2012 | Wagner |
| 8,535,498 B2 | 9/2013 | Inoue et al. |
| 8,551,322 B2 | 10/2013 | Schoenfisch et al. |
| 8,623,189 B2 | 1/2014 | Eckhardt |
| 8,784,640 B2 | 7/2014 | Coulon et al. |
| 8,795,484 B2 | 8/2014 | Stetter et al. |
| 9,097,652 B2 | 9/2015 | Say |
| 9,458,502 B2 | 10/2016 | Rothberg et al. |
| 9,617,149 B2 | 4/2017 | Lagae et al. |
| 10,620,151 B2 | 4/2020 | Berduque et al. |
| 11,022,579 B2 | 6/2021 | Berduque et al. |
| 11,268,927 B2 | 3/2022 | Berduque et al. |
| 11,959,876 B2 | 4/2024 | Berduque et al. |
| 2002/0123048 A1 | 9/2002 | Gau, Jr. |
| 2002/0187260 A1 | 12/2002 | Sheppard, Jr. et al. |
| 2003/0010808 A1 | 1/2003 | Uhland et al. |
| 2003/0049865 A1 | 3/2003 | Santini, Jr. et al. |
| 2003/0104590 A1 | 6/2003 | Santini, Jr. et al. |
| 2003/0105455 A1 | 6/2003 | Santini, Jr. et al. |
| 2004/0026246 A1 | 2/2004 | Chapples et al. |
| 2004/0034332 A1 | 2/2004 | Uhland |
| 2004/0106914 A1 | 6/2004 | Coppeta et al. |
| 2004/0106953 A1 | 6/2004 | Yomtov et al. |
| 2004/0121486 A1 | 6/2004 | Uhland et al. |
| 2004/0143236 A1 | 7/2004 | Santini, Jr. et al. |
| 2005/0050859 A1 | 3/2005 | Coppeta et al. |
| 2005/0055014 A1 | 3/2005 | Coppeta et al. |
| 2005/0096587 A1 | 5/2005 | Santini, Jr. et al. |
| 2005/0145330 A1 | 7/2005 | Shubinsky et al. |
| 2006/0057737 A1 | 3/2006 | Santini, Jr. et al. |
| 2006/0076236 A1 | 4/2006 | Shah et al. |
| 2006/0100608 A1 | 5/2006 | Uhland et al. |
| 2006/0105275 A1 | 5/2006 | Maloney et al. |
| 2006/0115323 A1 | 6/2006 | Coppeta et al. |
| 2006/0171888 A1 | 8/2006 | Santini, Jr. et al. |
| 2006/0234042 A1 | 10/2006 | Yang et al. |
| 2007/0036835 A1 | 2/2007 | Coppeta et al. |
| 2007/0187241 A1 | 8/2007 | Herbert |
| 2007/0299385 A1 | 12/2007 | Santini, Jr. et al. |
| 2008/0115361 A1 | 5/2008 | Santini, Jr. et al. |
| 2008/0115559 A1 | 5/2008 | Santini, Jr. et al. |
| 2008/0128285 A1 | 6/2008 | Moon et al. |
| 2008/0168921 A1 | 7/2008 | Uhland et al. |
| 2008/0221557 A1 | 9/2008 | Santini, Jr. |
| 2008/0289962 A1 | 11/2008 | Prohaska et al. |
| 2008/0302659 A1 | 12/2008 | Sheppard, Jr. et al. |
| 2009/0018413 A1 | 1/2009 | Santini, Jr |
| 2009/0024113 A1 | 1/2009 | Maloney et al. |
| 2009/0030404 A1 | 1/2009 | Uhland |
| 2009/0112188 A1 | 4/2009 | Santini, Jr. et al. |
| 2009/0142386 A1 | 6/2009 | Prescott et al. |
| 2009/0234214 A1 | 9/2009 | Santini, Jr. et al. |
| 2009/0301876 A1 | 12/2009 | Wagner et al. |
| 2010/0042075 A1 | 2/2010 | Santini, Jr. et al. |
| 2010/0126856 A1 | 5/2010 | Wang et al. |
| 2010/0137696 A1 | 6/2010 | Santini, Jr. et al. |
| 2010/0236924 A1 | 9/2010 | Chapples et al. |
| 2012/0130339 A1 | 5/2012 | Farra |
| 2012/0181185 A1 | 7/2012 | Vitushinsky et al. |
| 2013/0126349 A1 | 5/2013 | Zhang |
| 2013/0181760 A1 | 7/2013 | Lin |
| 2014/0062596 A1 | 3/2014 | Glibbery |
| 2014/0202855 A1 | 7/2014 | Merz et al. |
| 2014/0202856 A1 | 7/2014 | Roxhed et al. |
| 2014/0311905 A1 | 10/2014 | Stetter et al. |
| 2015/0001076 A1 * | 1/2015 | Porro ................. G01N 27/4045 216/18 |
| 2015/0009503 A1 | 1/2015 | Shimoyama et al. |
| 2015/0128715 A1 | 5/2015 | Kamimura et al. |
| 2015/0253276 A1 | 9/2015 | Le Neel et al. |
| 2015/0362451 A1 * | 12/2015 | Hunziker ............... G01N 27/26 73/31.06 |
| 2016/0047824 A1 * | 2/2016 | Dilleen ................ G01N 33/725 205/792 |
| 2016/0178565 A1 * | 6/2016 | Chapples ............. G01N 27/407 427/58 |
| 2017/0060769 A1 | 3/2017 | Wires et al. |
| 2017/0102355 A1 | 4/2017 | McGuinness et al. |
| 2017/0131228 A1 | 5/2017 | Gehrt et al. |
| 2018/0059044 A1 | 3/2018 | Berduque et al. |
| 2018/0266984 A1 * | 9/2018 | Pratt ................. G01N 27/4035 |
| 2019/0195825 A1 | 6/2019 | Berduque et al. |
| 2019/0242847 A1 | 8/2019 | Berduque et al. |
| 2021/0262973 A1 | 8/2021 | Berduque et al. |

FOREIGN PATENT DOCUMENTS

| | | |
|---|---|---|
| DE | 102009047299 A1 | 7/2011 |
| EP | 0284518 A2 | 9/1988 |
| EP | 0299779 A2 | 1/1989 |
| EP | 0299779 B1 | 6/1995 |
| EP | 0588153 B1 | 12/1996 |
| EP | 0586982 B1 | 7/1998 |
| EP | 1164372 B1 | 3/2010 |
| EP | 1305837 B1 | 11/2010 |
| EP | 2361380 B1 | 2/2015 |
| GB | 2235050 A | 2/1991 |
| GB | 2312753 B | 9/1999 |
| JP | S6488245 A | 4/1989 |
| JP | H03269254 A | 11/1991 |

(56) References Cited

FOREIGN PATENT DOCUMENTS

| | | | |
|---|---|---|---|
| JP | H03505785 A | | 12/1991 |
| JP | 2000235012 A | | 8/2000 |
| JP | 2003194773 A | | 7/2003 |
| JP | 2012527600 A | | 11/2012 |
| JP | 2013156259 A | | 8/2013 |
| KR | 20080050951 A | * | 6/2008 |
| WO | WO-9015323 A1 | | 12/1990 |
| WO | WO-02073177 A2 | | 9/2002 |
| WO | WO-2016097304 A1 | | 6/2016 |
| WO | WO-2017060769 A1 | | 4/2017 |
| WO | WO-2018041834 A3 | | 5/2018 |

OTHER PUBLICATIONS

"U.S. Appl. No. 17/314,307, Non Final Office Action mailed Nov. 25, 2022", 17 pgs.
"U.S. Appl. No. 17/314,307, Response filed Feb. 27, 2023 to Non Final Office Action mailed Nov. 25, 2022", 8 pgs.
U.S. Appl. No. 14/879,738, filed Oct. 9, 2015, Electrochemical Sensor, and a Method of Forming an Electrochemical Sensor.
U.S. Appl. No. 15/251,833 U.S. Pat. No. 10,620,151, filed Aug. 30, 2016, Electrochemical Sensor, and a Method of Forming an Electrochemical Sensor.
U.S. Appl. No. 16/329,664 U.S. Pat. No. 11,268,927, filed Feb. 28, 2019, Electrochemical Sensor, and a Method of Forming an Electrochemical Sensor.
U.S. Appl. No. 15/888,863 U.S. Pat. No. 11,022,579, filed Feb. 5, 2018, Retaining Cap.
U.S. Appl. No. 17/314,307, filed May 7, 2021, Retaining Cap.
"U.S. Appl. No. 17/314,307, Final Office Action mailed Mar. 9, 2023", 19 pgs.
"U.S. Appl. No. 17/314,307, Non Final Office Action mailed Jul. 7, 2023", 16 pgs.
"U.S. Appl. No. 17/314,307, Response filed May 17, 2023 to Final Office Action mailed Mar. 9, 2023", 8 pgs.
"U.S. Appl. No. 14/879,738, Advisory Action mailed Oct. 10, 2018", 3 pgs.
"U.S. Appl. No. 14/879,738, Final Office Action mailed Jul. 13, 2018", 17 pgs.
"U.S. Appl. No. 14/879,738, Non Final Office Action mailed Nov. 24, 2017", 17 pgs.
"U.S. Appl. No. 14/879,738, Response filed Apr. 24, 2018 to Non Final Office Action mailed Nov. 24, 2017", 11 pgs.
"U.S. Appl. No. 14/879,738, Response filed Aug. 23, 2017 to Restriction Requirement mailed Jun. 28, 2017", 7 pgs.
"U.S. Appl. No. 14/879,738, Response filed Sep. 13, 2018 to Final Office Action mailed Jul. 13, 2018", 12 pgs.
"U.S. Appl. No. 14/879,738, Restriction Requirement mailed Jun. 28, 2017", 10 pgs.
"U.S. Appl. No. 15/251,833, Advisory Action mailed Apr. 19, 2019", 5 pgs.
"U.S. Appl. No. 15/251,833, Advisory Action mailed Nov. 20, 2019", 10 pgs.
"U.S. Appl. No. 15/251,833, Examiner Interview Summary mailed Mar. 13, 2019", 3 pgs.
"U.S. Appl. No. 15/251,833, Examiner Interview Summary mailed Nov. 25, 2019", 3 pgs.
"U.S. Appl. No. 15/251,833, Final Office Action mailed Jan. 10, 2019", 12 pgs.
"U.S. Appl. No. 15/251,833, Final Office Action mailed Sep. 5, 2019", 11 pgs.
"U.S. Appl. No. 15/251,833, Non Final Office Action mailed May 30, 2018", 15 pgs.
"U.S. Appl. No. 15/251,833, Non Final Office Action mailed Jun. 6, 2019", 13 pgs.
"U.S. Appl. No. 15/251,833, Notice of Allowance mailed Dec. 16, 2019", 8 pgs.
"U.S. Appl. No. 15/251,833, Response filed Oct. 30, 2019 to Final Office Action mailed Sep. 5, 2019", 10 pgs.
"U.S. Appl. No. 15/251,833, Response filed May 9, 2019 to Advisory Action mailed Apr. 19, 2019", 11 pgs.
"U.S. Appl. No. 15/251,833, Response filed May 15, 2018 to Restriction Requirement mailed Mar. 16, 2018", 6 pgs.
"U.S. Appl. No. 15/251,833, Response filed Aug. 26, 2019 to Non-Final Office Action mailed Jun. 6, 2019", 9 pgs.
"U.S. Appl. No. 15/251,833, Response filed Aug. 30, 2018 to Non Final Office Action mailed May 30, 2018", 10 pgs.
"U.S. Appl. No. 15/251,833, Restriction Requirement mailed Mar. 16, 2018", 8 pgs.
"U.S. Appl. No. 15/251,833, Response filed Dec. 5, 2019 to Advisory Action mailed Nov. 20, 2019", 9 pgs.
"U.S. Appl. No. 15/888,863, Corrected Notice of Allowability mailed Feb. 17, 2021", 3 pgs.
"U.S. Appl. No. 15/888,863, Corrected Notice of Allowability mailed Apr. 14, 2021", 2 pgs.
"U.S. Appl. No. 15/888,863, Final Office Action mailed Mar. 30, 2020", 24 pgs.
"U.S. Appl. No. 15/888,863, Non Final Office Action mailed Sep. 8, 2020", 24 pgs.
"U.S. Appl. No. 15/888,863, Non Final Office Action mailed Nov. 26, 2019", 18 pgs.
"U.S. Appl. No. 15/888,863, Notice of Allowance mailed Jan. 27, 2021", 10 pgs.
"U.S. Appl. No. 15/888,863, Response filed Feb. 26, 2020 to Non Final Office Action mailed Nov. 26, 2019", 12 pgs.
"U.S. Appl. No. 15/888,863, Response filed Jun. 18, 2020 to Final Office Action mailed Mar. 30, 2020", 11 pgs.
"U.S. Appl. No. 15/888,863, Response filed Oct. 1, 2019 to Restriction Requirement mailed Aug. 1, 2019", 6 pgs.
"U.S. Appl. No. 15/888,863, Response filed Dec. 3, 2020 to Non Final Office Action mailed Sep. 8, 2020", 8 pgs.
"U.S. Appl. No. 15/888,863, Restriction Requirement mailed Aug. 1, 2019", 8 pgs.
"U.S. Appl. No. 16/329,664, 312 Amendment filed Dec. 28, 2021", 3 pgs.
"U.S. Appl. No. 16/329,664, Corrected Notice of Allowability mailed Jan. 25, 2022", 2 pgs.
"U.S. Appl. No. 16/329,664, Final Office Action mailed Jul. 1, 2021", 18 pgs.
"U.S. Appl. No. 16/329,664, Non Final Office Action mailed Mar. 15, 2021", 18 pgs.
"U.S. Appl. No. 16/329,664, Notice of Allowance mailed Oct. 27, 2021", 9 pgs.
"U.S. Appl. No. 16/329,664, PTO Response to Rule 312 Communication mailed Jan. 12, 2022", 2 pgs.
"U.S. Appl. No. 16/329,664, Response filed Jun. 15, 2021 to Non Final Office Action mailed Mar. 15, 2021", 9 pgs.
"U.S. Appl. No. 16/329,664, Response filed Sep. 30, 2021 to Final Office Action mailed Jul. 1, 2021", 10 pgs.
"U.S. Appl. No. 16/329,664. Preliminary Amendment Filed Feb. 28, 2019", 7 Pgs.
"U.S. Appl. No. 16/329,664. Response filed Feb. 15, 2021 to Restriction Requirement mailed Dec. 15, 2020", 7 pgs.
"U.S. Appl. No. 16/329,664. Restriction Requirement mailed Dec. 15, 2020", 6 pgs.
"U.S. Appl. No. 15/251,833, Office Action Response filed on Apr. 2, 2019", 10 pgs.
"Chinese Application Serial No. 201780061363.8, Office Action mailed Jun. 8, 2021", w/ English translation, 26 pgs.
"Chinese Application Serial No. 201780061363.8, Office Action mailed Oct. 16, 2020", w/ English Translation, 25 pgs.
"Chinese Application Serial No. 201780061363.8, Response filed Mar. 1, 2021 to Office Action mailed Oct. 16, 2020", w/ English claims, 13 pgs.
"Definition of Sensor", Merriam-Webster Dictionary, [Online] Retrieved from the Internet :<URL: https://www.merriam-webster.com/dictionary/sensor>, (Retrieved Aug. 26, 2020), 1 pg.
"European Application Serial No. 17797863.2, Communication pursuant to Article 94(3) EPC mailed Jul. 7, 2021", 4 pgs.
"European Application Serial No. 17797863.2, Response filed Aug. 16, 2021 to Communication pursuant to Article 94(3) EPC mailed Jul. 7, 2021", 12 pgs.

(56) References Cited

OTHER PUBLICATIONS

"Handbook of Chemical and Biological Sensors", Chemical and Biological Sensors book, (Jan. 1996), 1 pg.
"Hydrogen Sulfide 500 HS 4S", Sensor Datasheet H2S 500 HS 4S Rev12-11-15.doc, (Dec. 11, 2015), 2 pgs.
"International Application Serial No. PCT/EP2017/071669, International Search Report mailed Apr. 19, 2018", 6 pgs.
"International Application Serial No. PCT/EP2017/071669, Invitation to Pay Add'l Fees and Partial Search Report mailed Jan. 17, 2018", 11 pgs.
"International Application Serial No. PCT/EP2017/071669, Written Opinion mailed Apr. 19, 2018", 10 pgs.
"International Application Serial No. PCT/EP2019/052262, International Search Report mailed Apr. 17, 2019", 4 pgs.
"International Application Serial No. PCT/EP2019/052262, Written Opinion mailed Apr. 19, 2019", 5 pgs.
"International Application Serial No. PCT/IB2016/001518, International Search Report mailed Mar. 24, 2017", 7 pgs.
"International Application Serial No. PCT/IB2016/001518, Written Opinion mailed Mar. 24, 2017", 9 pgs.
"Japanese Application Serial No. 2019-532191, Examiners Decision of Final Refusal mailed Sep. 14, 2020", w/ English translation, 6 pgs.
"Japanese Application Serial No. 2019-532191, Office Action mailed Mar. 23, 2020", w/ English Translation, 17 pgs.
"Japanese Application Serial No. 2019-532191, Response filed Jan. 13, 2021 to Examiners Decision of Final Refusal mailed Sep. 14, 2020", w/ English claims, 8 pgs.
"Japanese Application Serial No. 2019-532191, Response filed Jun. 23, 2020 to Office Action mailed Mar. 23, 2020", w/ English Claims, 11 pgs.
"JPH10273329", English translation, (1998), 12 pgs.
"Model: PET bottle 1000ml M1 cylindrical 28/410 45g transparent", Indumel Packaging, Investigation and Development, Product Datasheet Version 3; XP055577515, [Online} Retrieved from the Internet: <URL:https://indumel.pt/wp-content/uploads/pdf/0900410000%20Ficha%20Tecnica%20-%20Tampa%20dupla%20laranja-laranja%200249-0249.pdf>, (Jul. 24, 2017), 1 pg.
"Nitrogen Dioxide Micro+ Technical Specification", Sensor Datasheet NO2 100 Micro+, Rev13-02-26.doc, (Feb. 26, 2013), 2 pgs.
Bai, Hua, et al., "Gas sensors based on conducting polymers", Sensors, 7(3), [Online] Retrieved from the internet on Apr. 19, 2016:<URL:http://www.ncbi.nlm.nih.gov/pmc/articles/PMC3756721/#b219sensors0700267>, (Mar. 7, 2007), 1-33.
Berduque, Alfonso, et al., "Electrochemical detection of dopamine using arrays of liquid-liquid micro-interfaces created within micromachined silicon membranes", Analytica Chimica Acta, 611, (2008), 156-162.
Berduque, Alfonso, et al., "Voltammetric characterisation of silicon-based microelectrode arrays and their application to mercury-free stripping voltammetry of copper ions", Talanta, 71, (2007), 1022-1030.
Huang, et al., "Post-CMOS Compatible Microfabrication of a Multi-Analyte Bioelectrochemical Sensor Array Microsystem", IEEE Sensors 2006, EXCO, Daegu, KR, (Oct. 22-25, 2006), 612-615.
Huang, Yue, et al., "Lab-on-CMOS Integration of Microfluidics and Electrochemical Sensors", Proc. of the 6th IEEE Intl. Conference on Nano/Micro Engineered and Molecular Systems, (Feb. 2011), 690-693.
Hung, Wen Tung, et al., "An Electrochemical Gas Sensor for Nitrogen Dioxide based on Pt/Nafion Electrode", Journal of New Materials for Electrochemical Systems, 5, (2002), 305-313.

Ishizu, K, et al., "Carbon dioxide gas sensor with ionic gel", IEEE Transducers & Eurosensors XXVII: The 17th Intl. Conference on Solid-State Sensors, Actuators and Microsystems, (Jun. 2013), 1633-1636.
Joo, Segyeong, "Chemical sensors with integrated electronics", Chem. Rev., 108(2), (2008), 638-651.
Maclay, G. Jordan, et al., "Microfabricated Amperometric Gas Sensors", IEEE Transactions on Electron Devices, vol. 35, No. 6., (Jun. 1988), 793-799.
Madou, Marc, et al., "Electrolytic media for chemical sensors", Solid State Ionics, 28-30, (1988), 1653-1659.
Maseeh, Fariborz, et al., "A Novel Silicon Micro Amperometric Gas Sensor", Proc. of the Intl. Conference on Solid State Sensors and Actuators, Transducers. Vol. 91, (1991), 359-362.
Mu, Xiaoyi, et al., "Fabrication of a Minaturized Room Temperature Ionic Liquid Gas Sensor for Human Health and Safety Monitoring", 2012 IEEE Biomedical Circuits and Systems Conference (BioCAS), (2012), 140-143.
Opekar, Frantisek, "Amperometric Solid-State Gas Sensors: Materials for Their Active Components", Critical Reviews in Analytical Chemistry, 32(3), (2002), 253-259.
Scanlon, Micheal D., et al., "Ion-Transfer Eletrochemistry at Arrays of Nanointerfaces Between Immiscible Eletrolyte Solutions Confined within Silicon Nitride Nanopore Membranes", Analytical Chemistry, vol. 82, No. 14, (2010), 6115-6123.
Singh, Virendra V, et al., "Applicatons of Ionic Liquids in Electrochemical Sensors and Biosensors", International Journal of Electrochemistry, (2012), 20 pgs.
Taliercio, T, et al., "Realization of porous silicon membranes for gas sensor applications", Thin Solid Films 255, (1995), 310-312.
Tess, Mark E., et al., "Humidity-independent solid-state amperometric sensor for carbon monoxide based on an electrolyte prepared by Sol-Gel Chemistry", Analytical chemistry, 70(1), (1998), 187-190.
Van Der Wal, P. D., et al., "The development of a Nation based amperometric carbon monoxide sensor for domestic safety", Analusis, 27, No. 4, (1999), 347-351.
Walewyns, Thomas, et al., "Fabrication of a miniaturized ionization gas sensor with polyimide spacer", Conference Paper in Proceedings of SPIE—The International Society for Optical Engineering, (May 2011), 8 pgs.
Wartelle, Corinne, et al., "Novel biocompatible hydrogel-based amperometric sensor for nitric oxide gas detection: towards a non-invasive device", Chem. Commun., 2004, (May 7, 2004), 1302-1303.
White, Rob, "Reducing Risks and the Cost of Gas Detection", IETMarch / Apr. 2013, (Apr. 2013), 39-40.
Xiong, Linhongjia, et al., "Amperometric Gas detection: A Review", Int. J. Electrochem. Sci., 9, (2014), 7152-7181.
Yan, Heqing, et al., "A solid polymer electrolyte-based electrochemical carbon monoxide sensor", Sensors and Actuators B, 17, (1994), 165-168.
Yasuda, Ayumu, et al., "Electrochemical carbon monoxide sensor with a Nafion(r) film", Reactive & Functional Polymers, 41, (1999), 235-243.
Zazpe, Raul, "Characterisation of Arrays of Micro-Liquid | Liquid Interfaces", Thesis, Tyndall National Institute/University College Cork, (Sep. 2005), 138 pgs.
Zazpe, Raul, et al., "Ion-transfer voltammetry at silicon membrane-based arrays of micro-liquid-liquid interfaces", Lab Chip, 7, (2007), 1732-1737.
"U.S. Appl. No. 17/314,307, Response filed Nov. 29, 2023 to Non Final Office Action mailed Jul. 7, 2023", 8 pgs.
"European Application Serial No. 17797863.2, Communication Pursuant to Article 94(3) EPC mailed May 8, 2024", 5 pgs.
"European Application Serial No. 17797863.2, Response filed Sep. 3, 2024 to Communication Pursuant to Article 94(3) EPC mailed May 8, 2024".

\* cited by examiner

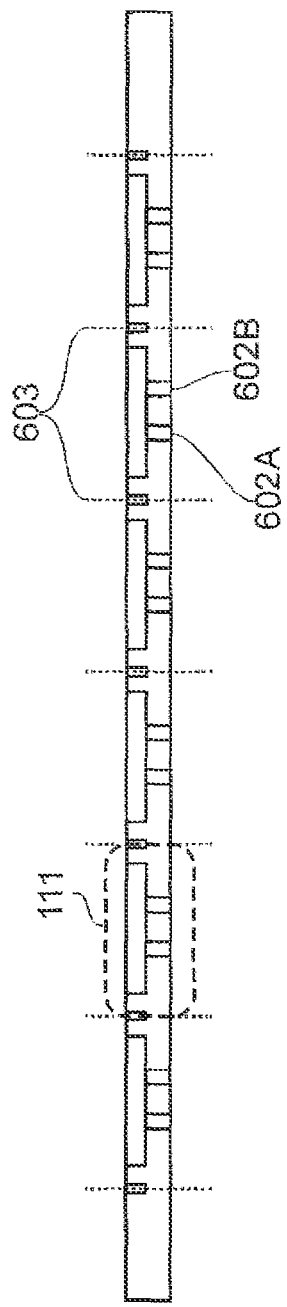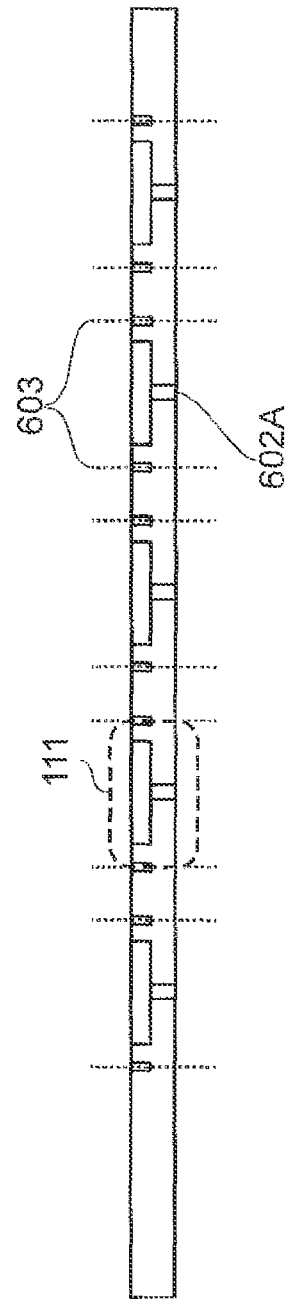
FIG. 16A
FIG. 16B

ELECTROCHEMICAL SENSOR, AND A METHOD OF FORMING AN ELECTROCHEMICAL SENSOR

PRIORITY AND RELATED APPLICATIONS

This application is a division of U.S. patent application Ser. No. 16/329,664, filed Feb. 28, 2019, which is a National Stage Fling under 35 U.S.C. § 371 of International Patent Application Serial No. PCT/EP2017/071669, filed Aug. 29, 2017, and published on Mar. 8, 2018, as WO 2018/041834 A2, which claims the benefit of priority to U.S. Non-Provisional patent application Ser. No. 15/251,833, filed on Aug. 30, 2016, each of which are hereby incorporated by reference herein in their entirety.

FIELD OF THE DISCLOSURE

The present disclosure relates to an electrochemical sensor and a method of forming an electrochemical sensor.

BACKGROUND

Electrochemical sensors are known which typically comprise three electrodes in contact with an electrolyte. These electrodes are normally identified as a working electrode, a counter electrode and a reference electrode. Generally speaking, in such sensors, the reference electrode is held at a constant potential with respect to the working electrode. The presence of substances which interact with the working electrode/electrolyte interface can invoke current flow between the working electrode and the counter electrode as a result of reduction/oxidation (REDOX) reactions at the working electrode. Other electrochemical sensors may only have a working electrode and a counter electrode and in such sensors the potential difference, current flow or resistance between those electrodes may be measured.

Generally speaking, such electrochemical sensors are made on a one by one basis or by using techniques that are quite variable. As a result, the sensors tend to vary from one to another. In some fields of use, such as carbon monoxide sensors, this is not too much of an issue as the trigger threshold for the associated electronics to issue an alarm is set so high that there can be no doubt that an unsafe level of carbon monoxide has been reached. However, for situations where greater precision and/or resolution are required then the sensors have to be calibrated prior to use. This is generally expensive and/or time consuming. Furthermore, it is generally desirable to reduce the size of sensors, in order to increase the range devices and applications with which they can be used.

SUMMARY OF THE DISCLOSURE

An electrochemical sensor is provided which may be formed using micromachining techniques commonly used in the manufacture of integrated circuits. This is achieved by forming microcapillaries in a silicon substrate and forming an opening in an insulating layer to allow environmental gases to reach through to the top side of the substrate. A porous electrode is printed on the top side of the insulating layer such that the electrode is formed in the opening in the insulating layer. The sensor also comprises at least one additional electrode. The electrolyte is then formed on top of the electrodes. A cap is formed over the electrodes and electrolyte. This arrangement may easily be produced using micromachining techniques.

According to a first aspect of this disclosure there is provided an electrochemical sensor comprising a substrate, an insulating layer, at least two electrodes, at least one the electrodes being a porous electrode, and an electrolyte; wherein the at least one porous electrode is formed in an opening in the insulating layer, the electrolyte is formed as a layer over the electrodes and the insulating layer, the substrate has at least one hole formed therein, and the sensor is arranged such that the porous electrode is exposed to the environment through the at least one hole in the substrate.

According to a second aspect of this disclosure there is provided a method of manufacturing an electrochemical sensor, comprising: forming an insulating layer on a substrate; providing at least one hole in the substrate; providing an opening in the insulating layer; forming at least one porous electrode in the opening in the insulating layer such that the at least one electrode is exposed to the environment through the substrate; forming at least one additional electrode, over the insulating layer; forming a layer of electrolyte over the electrodes and the insulating layer.

According to a third aspect of this disclosure there is provided a method of manufacturing a plurality of electrochemical sensors on a wafer, the method comprising: processing a wafer substrate to partially construct a plurality of electrochemical sensors; providing a capping wafer comprising a plurality of caps; bonding the caps to the partial sensors to align the caps with the partial sensors; and dicing the resulting structure to produce a plurality of sensors.

Further features of the disclosure are defined in the appended claims.

BRIEF DESCRIPTION OF THE DRAWINGS

The teachings of this disclosure will be discussed, by way of non-limiting examples, with reference to the accompanying drawings, in which:

FIGS. 16A and 16B show cross sections through cap wafers in accordance with an embodiment of the disclosure;

DETAILED DESCRIPTION

The present disclosure provides an electrochemical sensor formed on a silicon substrate. In particular, the disclosure is concerned with a back-side sensor, in which exposure to environmental gases is through the back of the sensor. As such, in order for the gases to reach the electrode, or electrodes, and electrolyte formed on the top of the substrate, microcapillaries are formed in the substrate. Additionally, being silicon, an insulating layer must be formed on the top side of the substrate, in order to isolate the conductors from the substrate. In order to allow the gases to reach the electrodes, an opening is formed in the insulating layer, and the opening is aligned with the microcapillaries. The electrodes are screen or stencil printed onto the insulating layer, such that one of the electrodes is formed in the opening in the insulating layer, and against the top surface of the substrate. As an alternative, the electrodes may be deposited using lithographic deposition techniques. In order for the gases and the electrolyte to interact, the electrode is porous. A benefit of such an arrangements is that it is easily manufactured using micromachining techniques. As such, the sensors may be reduced in size, and produced in such a manner that multiple sensors have the same characteristics. Process variations are not as great as for prior art sensors that are made individually.

Figure 1:
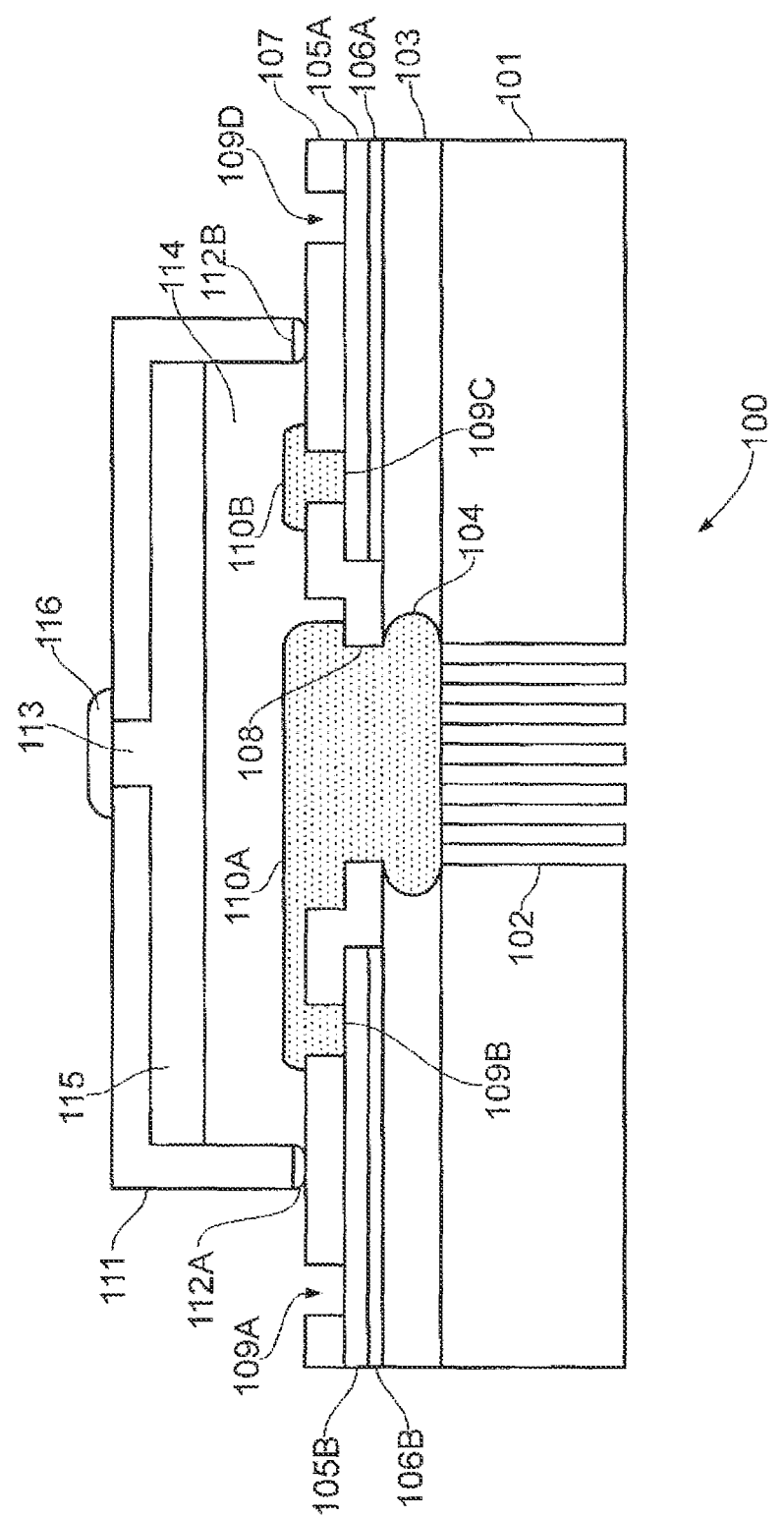
FIG. 1 is a cross-section through an electrochemical sensor according to a first embodiment.

FIG. 1 shows a cross-section through an electrochemical sensor 100 formed on silicon using micromachining techniques. The electrochemical sensor is formed on a silicon substrate 101. In this example, a single sensor is formed on the silicon substrate 101. However, in practice, several sensors may be formed on a single substrate, in a similar manner to the way in which multiple integrated circuits may be formed on a single silicon substrate. As an alternative to silicon, the substrate may be made from glass, ceramic or plastic. A plurality of microcapillaries 102 are formed in the substrate 101. In FIG. 1, six microcapillaries are shown in cross-section. However, the microcapillaries 102 are also formed across the width of the substrate, and as such there are typically ten or more microcapillaries. Each microcapillary is formed in a direction orthogonal to the surface of the substrate 101, and extends from an upper surface to a lower surface of the substrate. Each microcapillary is approximately 20 μm in diameter, although each microcapillary may be in the range of 1 μm to 2 mm in diameter. The group of microcapillaries 102 is approximately 1 mm across, but may be in the range of 0.001 mm to 3 mm across.

An insulating layer 103 is formed on the upper surface of the substrate 101. The insulating layer 103 may be formed from silicon oxide ($SiO_2$) and is approximately 4 μm thick. An electrode opening 104 is formed in the insulating layer 103 in a position that is aligned with the microcapillaries 102. The opening is described as being aligned in the sense that the microcapillaries are formed in an area defined by the opening in the insulating layer. The walls of the opening 104 are not necessarily precisely aligned with the walls of the microcapillaries. In this example, the opening 104 is approximately circular, but may be square or rectangular. The opening 104 may be 1 to 2 mm across. The side walls of the opening 104 are semi-circular in shape. However, it will be appreciated that the side walls may be straight or may be formed from any other shape that increases the surface area of the side walls.

Conductive tracks 105A, 105B are formed on a top surface of the insulating layer 103. The conductive tracks 105A, 105B are adhered to the insulating layer 103 by an adhesion layer 106A, 106B. The conductive tracks 105A, 105B may be made of gold or any other suitable conductive material. For example, the conductive tracks may be made from metal or conductive plastic. The conductive tracks are arranged such that they stop approximately 25 μm from the edge of the opening 104. The tracks may stop anywhere between a few microns to a few millimeters from the edge of the opening. The conductive tracks 105A, 105B are for connecting the electrodes to external circuit elements. The conductive tracks may extend into the opening formed in the insulating layer 103. Additionally the conductive tracks may extend into the capillaries in order to improve contact resistance.

A passivation layer 107 is formed over the insulating layer 103 and the conductive tracks 105A, 105B. An opening 108 is formed in the passivation layer 107. The opening 108 is the same size as the electrode opening 104, and is aligned with the opening 104. Additional holes 109A, 109B, 109C, 109D are formed in the passivation layer to allow connections to be made between the electrodes (discussed below) and external circuit elements. Additional holes may be added for sensors with more than two electrodes.

As FIG. 1 shows a cross-section through the sensor 100, only a working electrode 110A and a counter electrode 110B are shown. The working electrode 110A is formed in the openings 104 and 108. The electrode completely fills the openings 104 and 108 and abuts the top surface of the substrate 101. The working electrode 110A extends approximately 25 μm above the top of the passivation layer 107. The working electrode 110A also extends into hole 109B. This provides an electrical connection to conductive track 105B, allowing connections to external circuit elements via hole 109A. A counter electrode 110B is formed in hole 109C. Counter electrode 110B also extends 25 μm above the passivation layer 107. The counter electrode 110B also extends into hole 109C. This provides an electrical connection to conductive track 105A, allowing connections to external circuit elements via hole 109D. The electrode 110A is printed directly on the microcapillaries 102. As such, the electrolyte 114 may be liquid. The electrode 110A prevents the electrolyte passing through the microcapillaries. The electrodes are porous and are made of a catalyst, such as platinum, and a fluoropolymer, such as polytetrafluoroethylene (PTFE). The electrode 110A thus provides the 3-phase porous surface required for the chemical reactions to take place. The catalyst is a medium to high surface area porous catalyst, such as platinum black. Sufficient catalyst is provided to ensure sufficient catalytic activity throughout the sensors lifetime. The catalyst may be one of platinum, gold, ruthenium, carbon black or iridium. Other appropriate materials may be used.

A cap 111 is formed over the electrodes 110A, 110B. In embodiments where additional electrodes are used, the cap 111 would also be formed over those electrodes. The cap may be formed from glass, ceramic, silicon or plastic. The cap 111 is sealed to the passivation layer 107 by epoxy/adhesive or frit glass 112A, 112B. Other bonding techniques may be used. A hole 113 is formed in the top of the cap 111. An electrolyte 114 is provided within the cap 111. Alternatively, two or more holes may be formed in the cap 111. This would enable the electrolyte to be vacuum filled. The electrolyte 114 may be made from a liquid solution, such as a conductive aqueous electrolyte or organic electrolyte, a conductive polymer, such as Nafion or PEDOT:PSS. The electrolyte may also be a hydrogel or a room temperature ionic liquid. In one example, the electrolyte may be sulfuric acid solution and may include a wicking material or wicking substructure. The electrolyte may be a two-layer electrolyte. The electrolyte 114 completely covers the electrodes, but when using liquid electrolytes, does not completely fill the cap 112. Instead, a void space 115 is left towards the top of the cap 111. The void space 115 may not be required when using conductive polymer electrolytes and hydrogels. Epoxy glue 116 is formed over the hole 113 to prevent any pollutants entering the cap, and also to prevent the electrolyte 114 from leaving the cap. Other options may be utilized for sealing. If two holes are provided in the cap 111, a seal may be formed over both holes. Alternatively, a larger hole could be covered with an adhered lid, once the cavity is filled.

If the cap 111 is made from plastic, the plastic material must be compatible with the electrolyte 114. Various plastic materials may be used. For example, the cap may be made from acrylonitrile butadiene styrene (ABS), PTFE, polycarbonate (PC), polyethylene (PE), amongst other plastics. Important properties of the plastic are its chemical resistance and its compatibility with the electrolytes.

In FIG. 1, the conductive tracks 105A, 105B are provided over the insulating layer 103. The openings 109A, 109D are provided outside of the cap 111 in order to allow the sensor to be connected to external devices. It may be preferable to omit the portion of the substrate 101 and insulting layer 103 that extend outside of the cap 111, in order to reduce the size of the sensor 100. In order to facilitate this, the conductive tracks may be omitted, and conductive vias may be formed through the substrate instead. This would enable connections to be made on the underside of the substrate 101. Additionally, the size of the substrate 101 may be reduced to the size of the cap 111.

The microcapillaries 102 may be lined with an insulating material. The purpose of this would be to electrically insulate the silicon substrate 101 from the electrodes.

Figure 2:
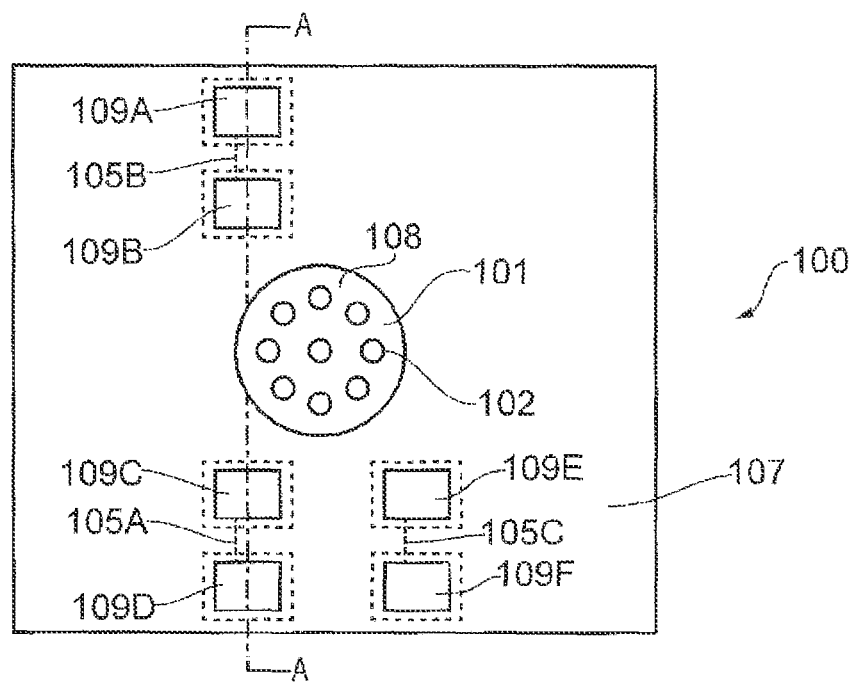
FIG. 2 is a top view of the sensor shown in FIG. 1.

FIG. 2 is a top view of the sensor 100 with certain components removed for clarity. In particular, the cap 111, the electrolyte 114, and the electrodes 110, are not shown. Holes 109A, 109B, 109C, 109D are shown in passivation layer 107. Additionally, holes 109E, 109F are formed in passivation layer 107. These additional holes are for accommodating an additional electrode not shown in FIG. 1. Holes 109E and 109F would not be needed in a two-electrode sensor. Opening 108 is also shown in FIG. 2, as well as a top surface of a portion of the substrate 101. The microcapillaries 102 are shown in the substrate 101. The sensor 100 also includes conductive tracks 105A, 105B, 105C. Broken line A-A represents the cross-section shown in FIG. 1.

Figure 3:
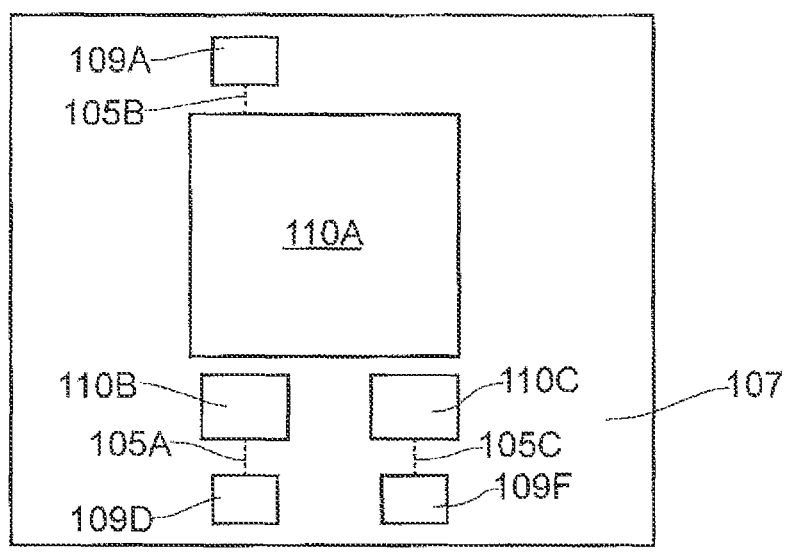
FIG. 3 is a further top view of the sensor shown in FIG. 1.

FIG. 3 shows the same top view as FIG. 2, with the addition of the electrodes 110. In particular, FIG. 3 shows working electrode 110A, counter electrode 110B and reference electrode 110C. Hole 109A provides access to a conductive track which is coupled to electrode 110A. Hole 109D provides access to a conductive track which is coupled to counter electrode 110B. Hole 109F provides access to a conductive track which is coupled to reference electrode 110C.

FIGS. 2 and 3 show a sensor with particular dimensions. These dimensions may be altered. For example, the opening 108 may be much larger than shown in FIG. 2, and in particular may cover much of the area occupied by the electrode 110A. The length and width of each sensor may be in the range of 1 mm to 10 mm. The overall thickness, including the substrate 101 and the cap 111 may be 1 mm. As such, on a typical 200 mm wafer, in excess of 1000 sensors may be produced.

In use, the sensor would be connected to a micro-controlled measurement system in a manner familiar to those skilled in the art. The sensor output may be continuously monitored and used to determine the concentration of analyte in the environment. The electrode 110A may come into contact with environmental gases via the microcapillaries 102. As the electrode 110A is porous, the environmental gases are able to pass through the electrode to a point where they come into contact with the electrolyte 114. A three-phase junction is therefore formed within the electrode. An advantage of using a printed, solid electrode 110A, is that it prevents the electrolyte 114 from escaping through the microcapillaries 102 in the substrate 101.

An advantage of the above-described structure is that silicon micromachining techniques can be used in its construction. As such, manufacturing of the sensor is compatible with fabrication techniques used to manufacture integrated circuits. By manufacturing multiple sensors in parallel, variations in the parameters of the sensors are reduced.

A further advantage of using silicon fabrication techniques is that the cost of each device is reduced. This is because each process step is applied to multiple sensors in parallel, so the processing cost per device is small. Additionally, micromachining techniques enable very small devices to be produced. As such, the sensors may be more easily incorporated into handheld devices. Furthermore, the sensors all see the same processing steps at the same time. As such, matching between devices is very good when compared with serially produced devices.

A method of fabricating the electrochemical sensor 100 will now be described with reference to FIGS. 4A to 4I.

Figure 4A:
FIG. 4A schematically illustrates a substrate at an initial phase of a fabrication process for the sensor shown in FIG. 1.

FIG. 4A shows the first step in the fabrication process. A silicon wafer is used as the silicon substrate 101. In the following, the process for forming one device will be described, however several hundred devices may be formed in parallel on the same wafer. The silicon substrate 101 is used for mechanical support, and could be substituted for another type of material, such as glass.

Figure 4B:
FIG. 4B shows the substrate after formation of an insulating layer.

An oxide insulating layer 103 is deposited on the wafer, as shown in FIG. 4B. The oxide layer serves as a "landing" oxide to stop the through wafer etch, and also serves as a layer to insulate the conductive tracks from the substrate to prevent shorting.

Figure 4C:
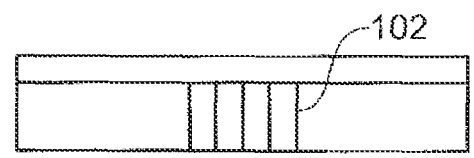
FIG. 4C shows the substrate after formation of microcapillaries.

The microcapillaries 102 are defined in the wafer by photolithography. The microcapillaries are etched through the wafer using an isotropic dry etch. They are etched from the backside of the wafer and stop at the oxide layer once the silicon wafer has been etched through, as shown in FIG. 4C.

Figure 4D:
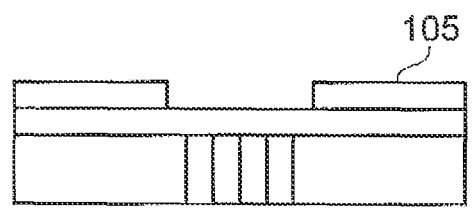
FIG. 4D shows the substrate after formation of a metal layer.

FIG. 4D shows formation of inert metal layers which form the conducting tracks 105. They are deposited on the insulation layer, on the front side of the wafer. An adhesive layer 106 is first deposited on the insulating layer 103, and is used to attach the metal layer to the insulating layer 103. The conductive tracks may be defined by photolithography and then etched. The thickness of the inert metal can be increased by electroplating in specific areas, as defined by photolithography.

Figure 4E:
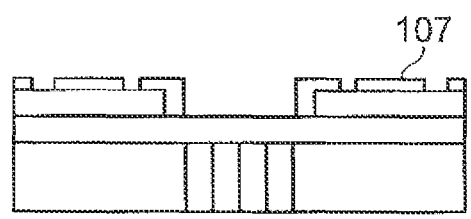
FIG. 4E shows the substrate after deposition and definition of the passivation layer.
Figure 4F:
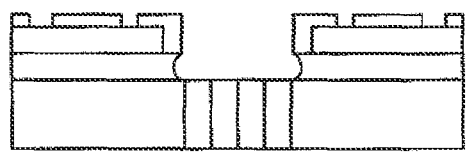
FIG. 4F shows the substrate after removal of a portion of the insulating layer.

FIG. 4E shows the sensor after deposition and definition of the passivation layer 107. The insulating oxide 103 on the front side of the wafer 101 is removed in the region of the microcapillaries 102 using a wet etch, as shown in FIG. 4F.

Figure 4G:
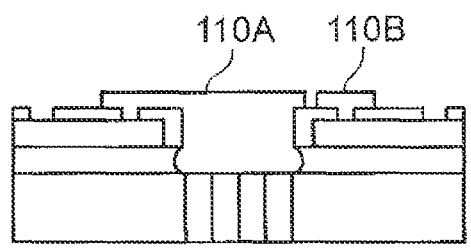
FIG. 4G shows the substrate after deposition of electrodes.

A porous electrode material is deposited on the wafer using screen printing, stencil printing, electroplating, or other lithographic deposition techniques to form electrodes 110A and 110B, as shown in FIG. 4G. Electrode 110A covers the microcapillaries 102, and connection is made to the conductive tracks.

Figure 4H:
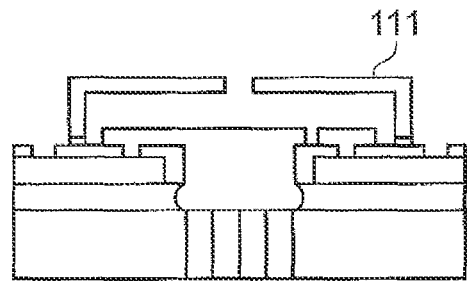
FIG. 4H shows the substrate after application of a cap.

The cap 111 is then placed over the sensor 100, as shown in FIG. 4H. As described above, the cap 111 may be made of plastic, ceramic, silicon or glass, amongst other materials. If the cap is made of plastic, it is prefabricated by injection molding. The recess and holes may be formed during the injection molding process. If the cap is made from glass, silicon or ceramic, the cap would typically be fabricated using wafer level processing techniques. For glass or ceramic caps, cavities can be made in the cap by firstly using photolithography to pattern the cap cavity. Then one of, or a combination of, wet etching, dry etching, sand blasting and laser drilling may be used to create the cavities in the cap. For silicon caps, cavities can be made in the cap by firstly using photolithography to pattern the cap cavity. Then one of, or a combination of, wet etching, dry etching, sand blasting, and laser drilling may be used to create the cavities in the cap.

Figure 4I:
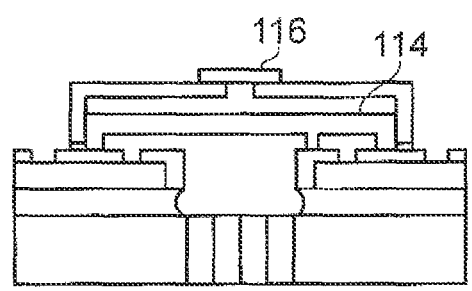
FIG. 4I shows the substrate after insertion of an electrolyte and formation of a cap.

The cap 111 is attached to the wafer through wafer bonding (wafer processing) or through placement with epoxy/adhesive on the sensor wafer (single cap placement process). Alternatively, the cap 111 may be attached by other means such as ultrasonics. The electrolyte 114 is dispensed through the cap hole 113 and the hole is sealed, as shown in FIG. 4I. As noted above, the cap 111 may have more than one hole.

Figure 5:
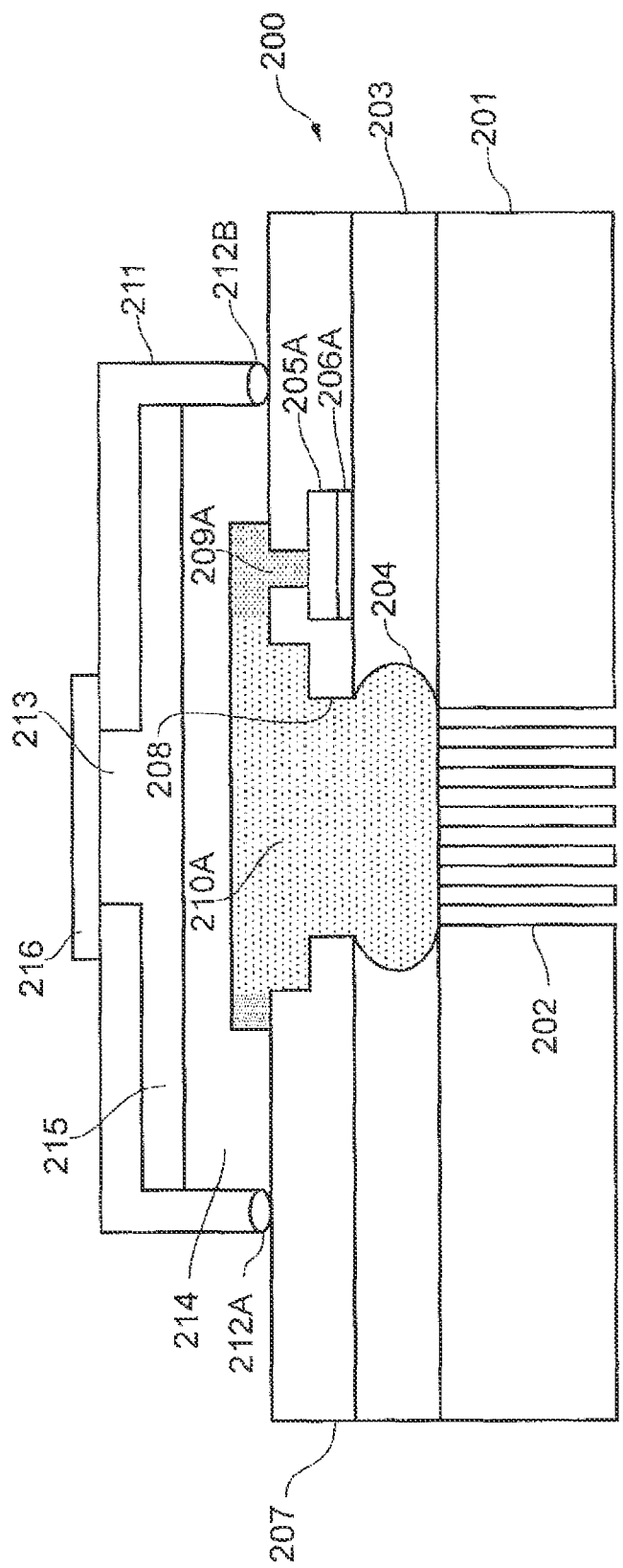
FIG. 5 is a cross-section through an electrochemical sensor according to a second embodiment.

FIG. 5 shows an alternative embodiment in accordance with the present disclosure. Most of the structure is the same as that shown in FIG. 1. An electrochemical sensor 200 includes a substrate 201 having a plurality of microcapillaries 202 formed therein. An insulating layer 203 is formed on a top surface of the substrate 201, and has an electrode opening 204 formed in a position aligned with the microcapillaries 202. A conductive pad 205A is formed on the insulating layer 203 and is attached thereto by adhesion layer 206A.

A passivation layer 207 is formed over the insulating layer 203, and has an opening 208 formed therein. The opening 208 is aligned with the opening 204. In addition, the passivation layer includes a hole 209A aligned with the conductive pad 205A. A working electrode 210A is formed in the openings 204 and 208, as well as in the opening 209A. A cap 211 is formed over the electrode 210A, and is attached to the passivation layer using adhesive 212A and 212B, or through wafer bonding. A hole 213 is formed in the top of the cap 211, and is for providing electrolyte 214 within the cap 211. A void space 215 may be formed above the electrolyte 214 if a liquid electrolyte is used, and an epoxy glue cap is provided over the opening 213. As noted above, other sealing techniques may be used to cover the opening 213.

Figure 6:
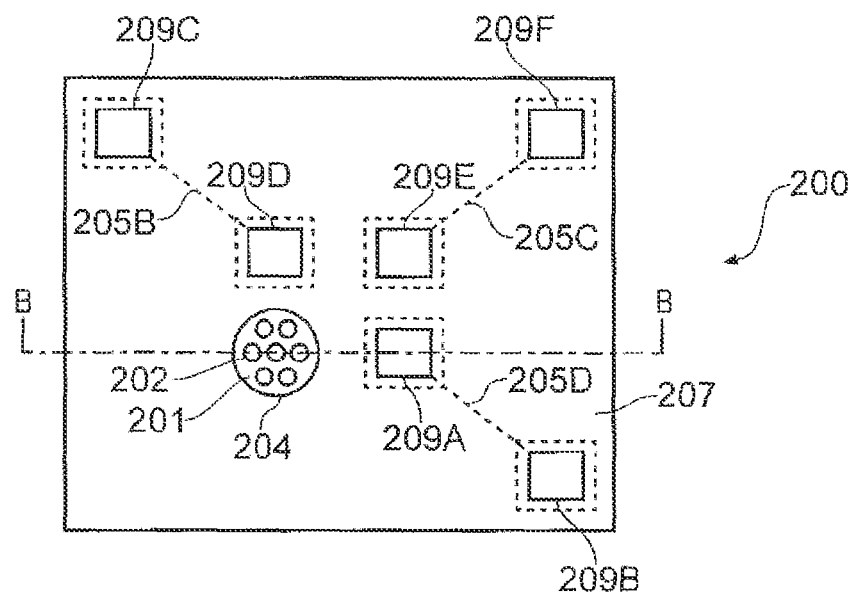
FIG. 6 is a top view of the sensor shown in FIG. 5.

FIG. 6 shows a top view of the electrochemical sensor 200 with various components removed. In particular, the electrode 210A, the electrolyte 214 and the cap 211 are not shown. The broken line B-B represents the cross-section of FIG. 5. As can be seen in FIG. 5, opening 204 and hole 209A are formed in passivation layer 207. Additionally, holes 209B, 209C, 209D, 209E, 209F are also formed in passivation layer 207.

Figure 7:
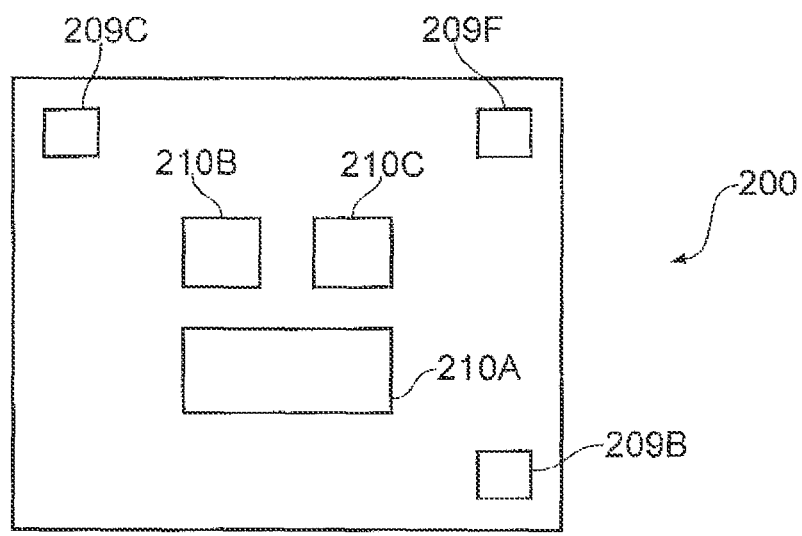
FIG. 7 is a further top view of the sensor shown in FIG. 5.

FIG. 7 also shows the same top view of electrochemical sensor 200. In this example, electrode 210A is shown formed over opening 204 and hole 209A. Additionally, counter electrode 210B and reference electrode 210C are also shown.

Figure 8:
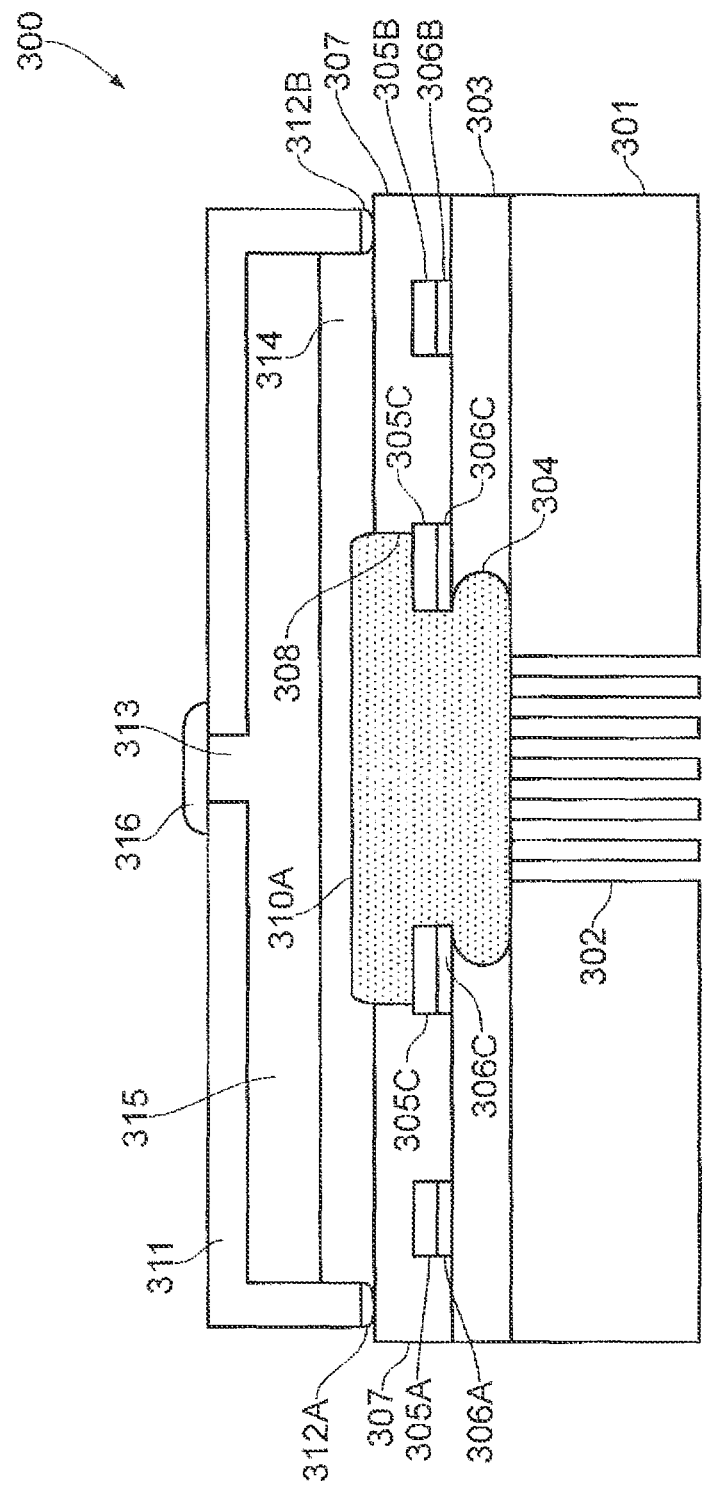
FIG. 8 is a cross-section through an electrochemical sensor according to a third embodiment.

FIG. 8 shows a further alternative embodiment in accordance with the present disclosure. Most of the structure is the same as that shown in FIGS. 1 and 5. An electrochemical sensor 300 includes a substrate 301 having a plurality of microcapillaries 302 formed therein. An insulating layer 303 is formed on a top surface of the substrate 301, and has an electrode opening 304 formed in a position aligned with the microcapillaries 302.

Conductive tracks 305A, 305B are formed on the insulating layer 303 and are attached thereto by adhesion layers 306A, 306B. The purpose of these tracks is to connect electrodes (not shown in FIG. 8) to external connections (also not show in FIG. 8). These tracks will be made clearer below in connection with FIGS. 9 and 10. A conductive pad 305C is also formed on the insulating layer 303, and is attached to the insulting layer using adhesion layer 306C. Conductive pad 305C is formed around the opening 304 in the insulating layer 303. This will be shown more clearly below in connection with FIGS. 9 and 10.

A passivation layer 307 is formed over the insulating layer 303 and the conductive tracks 305A, 305B and conductive pad 305C. The passivation layer 307 is not formed over the entire conductive pad 305C, and as such has an opening 308 formed therein. The passivation layer 307 overlaps the edges of the pad 305C by around 10 to 100 μm. The opening 308 is aligned with, but wider than, the opening 304. A working electrode 310A is formed in the openings 304 and 308, as well as over the conductive pad 305C.

A cap 311 is formed over the electrode 310A (and the other electrodes that are not shown), and is attached to the passivation layer 307 using adhesive 312A and 312B, or using wafer bonding. A hole 313 is formed in the top of the cap 311, and is for providing electrolyte 314 within the cap 311. A void space 315 may be formed above the electrolyte 314 if a liquid electrolyte is used, and an epoxy glue cap 316 is provided over the opening 313.

Figure 9:
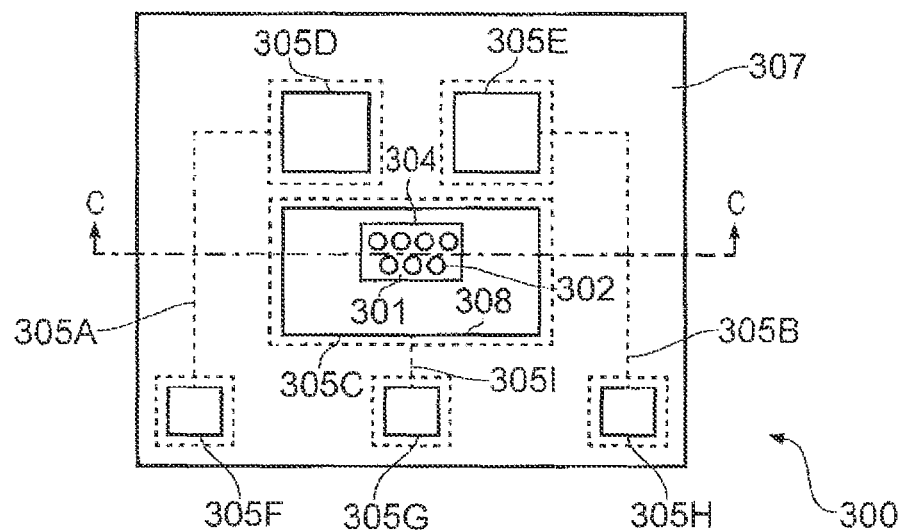
FIG. 9 is a top view of the sensor shown in FIG. 8.

FIG. 9 shows a top view of the electrochemical sensor 300 with various components removed. In particular, the electrodes 310A, 310B, 310C, the electrolyte 314 and the cap 311 are not shown. The broken line C-C represents the cross-section of FIG. 8. The conductive pad 305C is formed towards the middle of the sensor 300. The conductive pad 305C is formed around the opening 304 in the insulating layer 303. As such, the microcapillaries 302 may be seen in the substrate 301. The sensor 300 also includes two further conductive pads 305D and 305E. These pads are for having electrodes formed thereon. The sensor 300 also includes three external connection pads 305F, 305G, 305H. These pads are connected to respective electrode pads by respective tracks 305A, 305I and 305B. These tracks are shown as hashed lines as they are not visible through the passivation layer 307. The passivation layer 307 is formed over the insulating layer 303. The passivation layer covers the tracks 305A, 305I, and 305B, but does not cover the conductive pads 305C, 305D, 305E, 305F, 305G, 305H.

Figure 10:
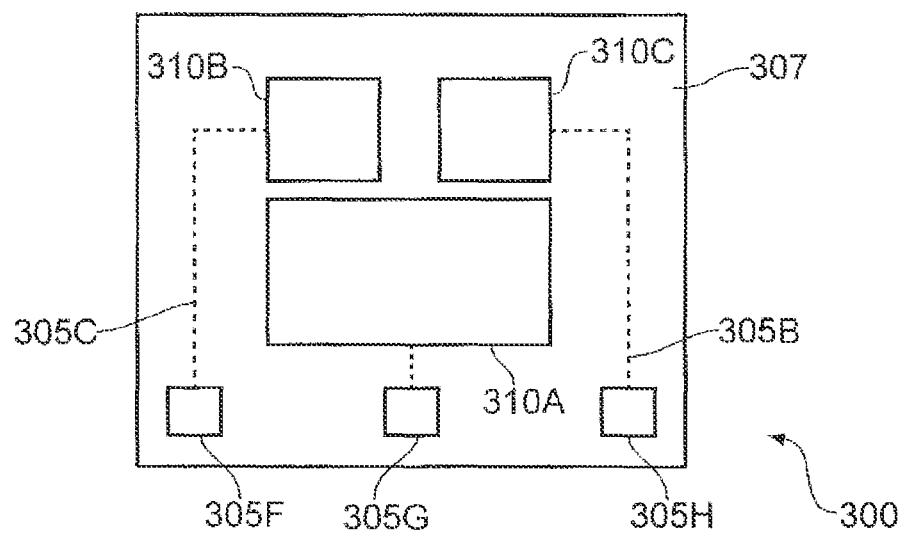
FIG. 10 is a further top view of the sensor shown in FIG. 8.

FIG. 10 also shows the same top view of electrochemical sensor 300. In this figure, electrode 310A is shown formed over openings 304, 308, and conductive pad 305C. Additionally, counter electrode 310B and reference electrode 310C are also shown.

Figure 11:
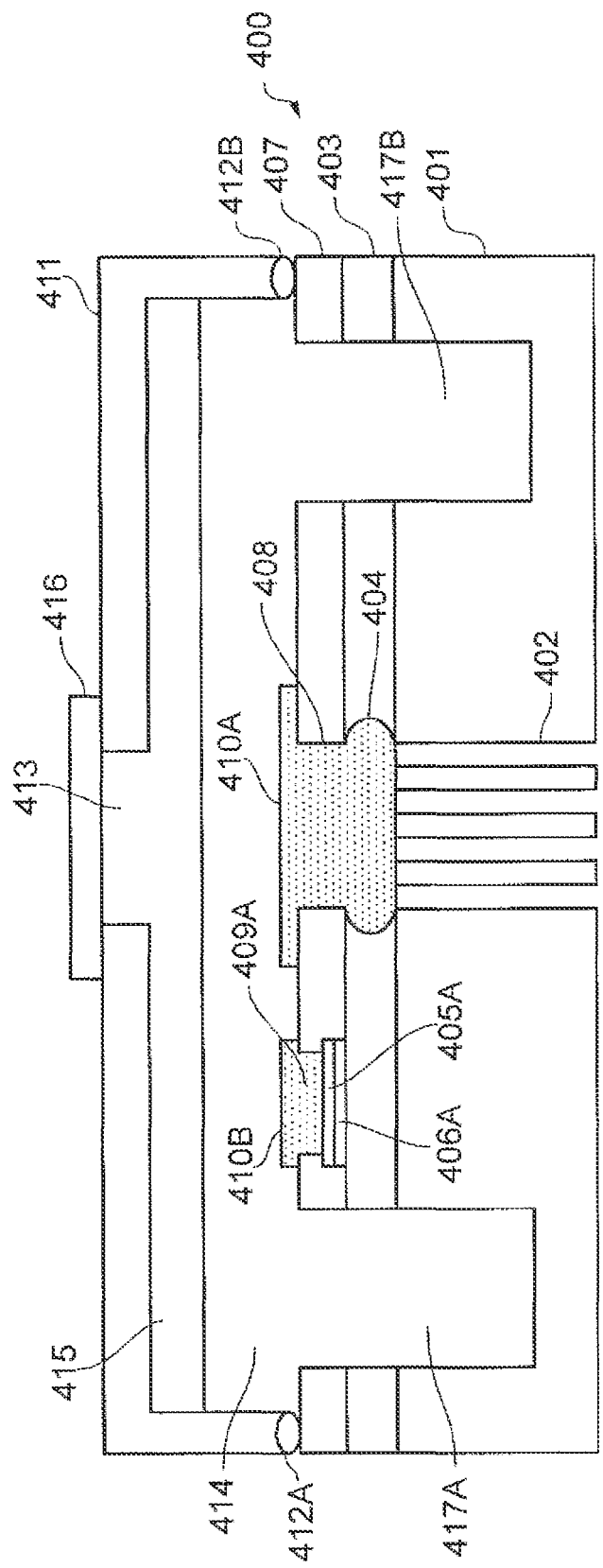
FIG. 11 is a cross-section through an electrochemical sensor according to a fourth embodiment.

FIG. 11 shows an example of an electrochemical sensor 400 in accordance with a further embodiment in the present disclosure. Most of the structure is the same as that shown in FIG. 1. The electrochemical sensor 400 includes a substrate 401 having a plurality of microcapillaries 402 formed therein. An insulating layer 403 is formed on a top surface of the substrate 401, and has an electrode opening 404 formed in a position aligned with the microcapillaries 402. Conductive pads 405 are formed on the insulating layer 403 and are attached thereto by adhesion layer 406.

A passivation layer 407 is formed over the insulating layer 403, and has an opening 408 formed therein. The opening 408 is aligned with the electrode opening 404. In addition, the passivation layer includes a hole 409A aligned with the conductive pad 405A. A working electrode 410A is formed in the openings 404 and 408. A counter electrode 410B is formed in the opening 409A. A cap 411 is formed over the electrodes 410, and is attached to the passivation layer 407 using adhesive 412A and 412B, or using wafer bonding processes). A hole 413 is formed in the top of the cap 411, and is for providing electrolyte 414 within the cap 411. A void space 415 may be formed above the electrolyte 414, when liquid electrolytes are used, and an epoxy glue cap 416 is provided over the opening 413. As with sensor 100, sensor 300 may include an additional reference electrode formed over an additional hole in the passivation layer.

In contrast with the previous embodiments, recesses 417A and 417B are formed in the substrate 401, the insulating layer 403, and the passivation layer 407. The electrolyte 414 fills recesses 417A and 417B and part of the cap volume. In FIG. 11, the substrate 401 forms the walls of the recesses 417A, 417B. As an alternative, the walls and base of the recesses 417A, 417B may be covered in a layer of insulating material. This layer may be the insulating layer 403. The purpose of this is to insulate the electrolyte from any galvanic path that may be formed through the silicon substrate to the electrodes. The insulating layer may be provided using thermal oxidation or vapor deposition.

Figure 12:
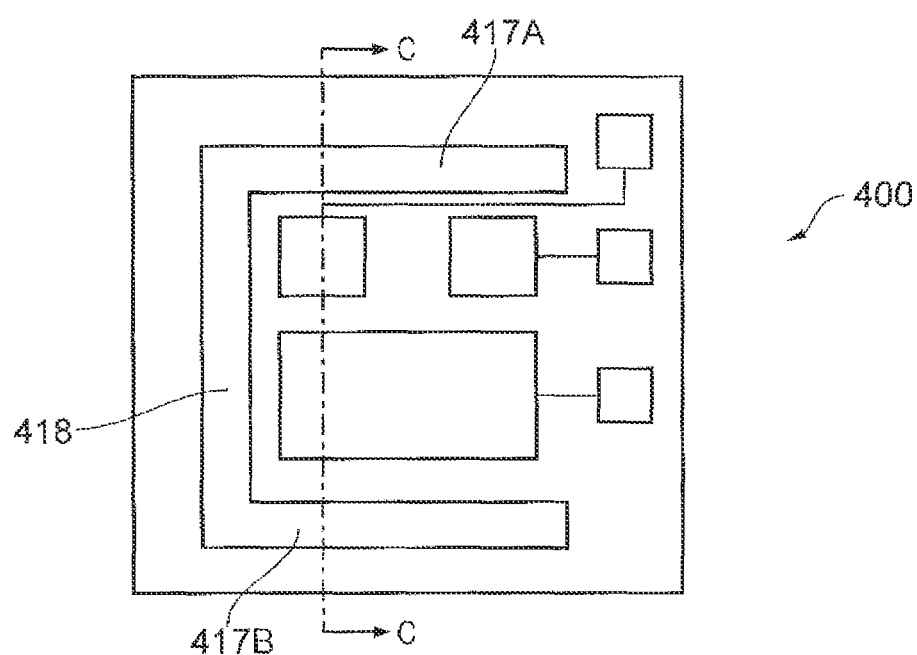
FIG. 12 is a top view of the sensor shown in FIG. 11.

FIG. 12 shows a top view of the electrochemical sensor 400 shown in FIG. 11. Here, the recesses 417A and 417B may be seen. The recesses together form a microwell 418. The microwell 418 forms a 'C' shape around the top, left and bottom sides of the electrodes 410. Other shapes may be used depending on the design of the sensor.

Figure 13A:
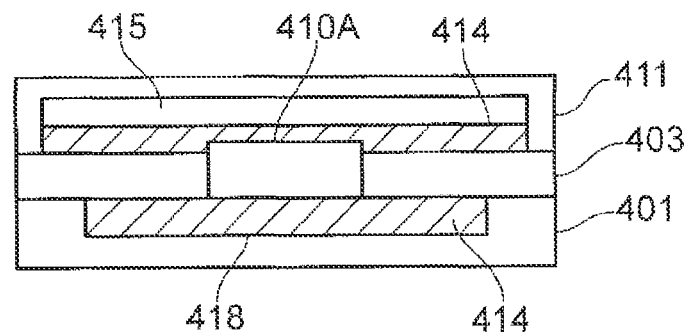
FIGS. 13A to 13C demonstrate the operation of the sensor of FIG. 11.
Figure 13B:
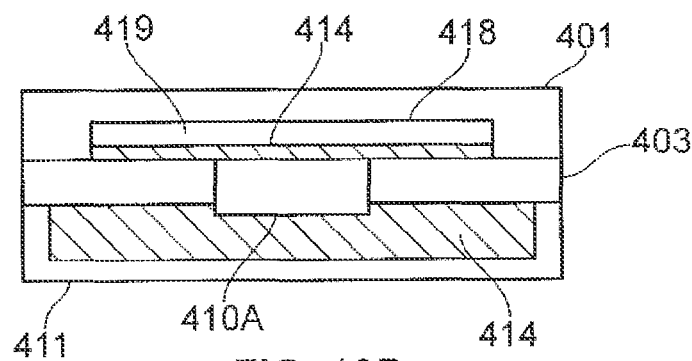
Figure 13C:
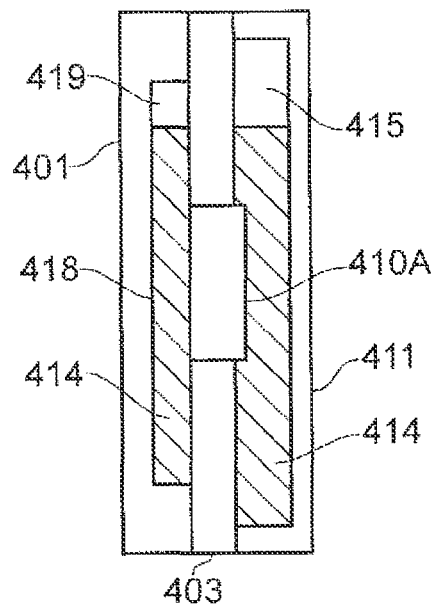

FIGS. 13A to 13C show the function of the microwell 418. In FIG. 13A, electrochemical sensor 400 is upright, and the electrolyte 414 fills the microwells such that the electrolyte also covers the electrode 410A (as well as electrodes 410B and 410C which are not shown).

In FIG. 13B, the electrochemical sensor 400 is upside down. As can be seen, the electrolyte 414 now fills the cap 411, and a void space 419 is formed in the microwells 418. As such, the electrodes 410A, 410B and 410C are completely covered by the electrolyte 414.

In FIG. 13C, the electrochemical sensor 400 is shown on its side. Here, the electrolyte 414 fills the microwell 418 and the cap 411 such that a void space is provided in a portion of the cap 411 and the void space 418. As such, the electrodes 410 are completely covered by electrolyte 414. As can be seen, the advantage of providing microwells in this manner is that the electrodes are always covered by electrolyte no matter their orientation. A further benefit of using microwells is that an additional wicking material is not required in the sensor. Additionally, sensor life is improved because the sufficient electrolyte and void space are provided, even in extreme temperatures and humidity.

Figure 14A:
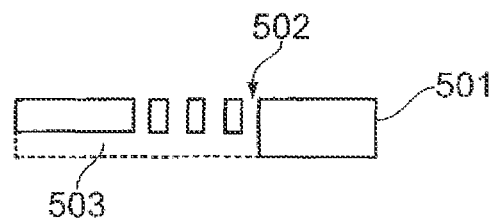
FIGS. 14A to 14C show cross sections through substrates in accordance with one or more embodiments disclosure.
Figure 14B:
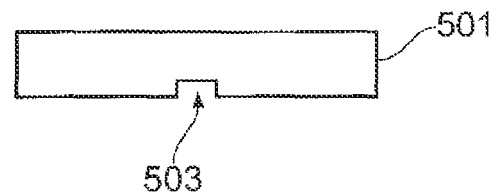
Figure 14C:
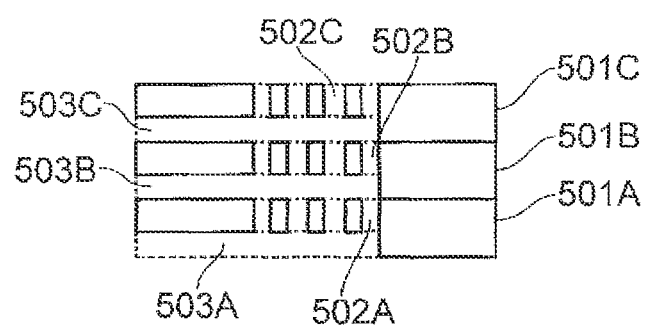

FIGS. 14A to 14C show a substrate 501 in accordance with a further embodiment of the present disclosure. FIG. 14A shows a cross-section through a substrate 501. FIG. 14B shows an end-view of the substrate 501. The substrate 501 is the same as the substrate 101 in most respects. In particular, the substrate 501 includes microcapillaries 502. However, in contrast to substrate 101, the substrate 501 includes a trench 503. The trench is formed in an underside of the substrate 501, and extends from the microcapillaries 502 to an edge of the substrate 501. The purpose of the trench is to enable environmental gases to reach the microcapillaries in the event the substrate 501 is placed on a solid surface. This would enable several sensors to be stacked, as shown in FIG. 14C. Alternatively, this would enable the sensor to be placed on another die, such as a microcontroller.

Figure 15:
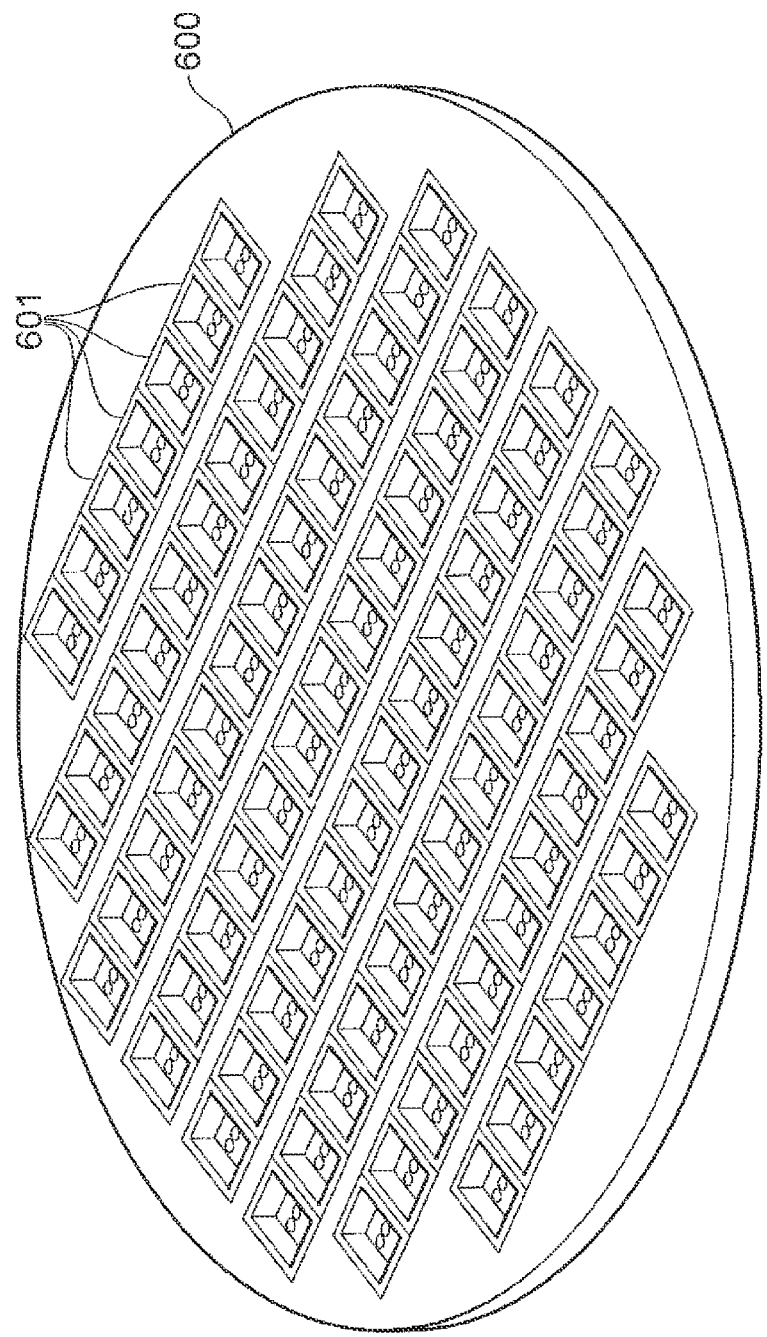
FIG. 15 shows a cap wafer in accordance with an embodiment of the disclosure.

FIG. 15 shows multiple caps formed in a wafer. In the process described above in connection with FIG. 4, the sensor dies and the caps are described as being formed on an individual level. Advantageously, the above-described sensors may be manufactured as multiple identical units using one or more wafers. Specifically, the substrate may be formed from a single wafer, and the sensors may be built up using parallel processing. Furthermore, a plurality of caps may be formed in a single wafer. FIG. 15 shows a wafer 600 which includes a plurality of caps 601. Several caps are formed in each of a number of parallel lines.

If forming the caps 601 from plastic, the entire wafer may be injection moulded to include the plurality of caps. The plastic caps in the wafer can then be bonded to the sensor wafer by epoxy glue, heat treatment or other means. Each cap may then be diced by laser cutting or other wafer dicing techniques. The caps could also be "partially" bonded to the sensor die by e.g. glue or heat treatment, then diced, and then doing the "complete" bonding with more glue, or other means. If forming the caps 601 from silicon, traditional wafer processing techniques may be used to form the caps.

Access for bond wires through the cap wafer to contact the sensor bondpads would be required. This could be done by forming holes which go through the cap wafer and align with the bondpads on the sensor wafer prior to wafer bond. Alternatively, vias may be formed in the substrate, as noted above, to avoid the need for openings in the cap. In the case of silicon, removal of unwanted silicon on the cap wafer to give access the bondpads on the sensor wafer could be done through a dicing and singulation process.

FIGS. 16A to 16B show cross sections through a wafer. In FIG. 16A, the wafer 600 includes a plurality of caps 601. Each cap includes two holes 602A, 602B. In this example, the caps are adjacent each other, with no spacing between the caps. In FIG. 16B, the same wafer is shown but with the cross-section orthogonal to the one shown in FIG. 16A. The wafer 600 includes a plurality of caps 601. Each cap includes a two holes, but only one of the holes 602A can be seen in this cross-section. In this cross-section, the caps include a spacing section 603, between each cap. In each case, the positioning 603 of the dicing procedure is shown.

The above-described sensors have a broad application space. For example, they are suitable for mobile sensing, smart phones, watches, wearables, etc. This is because of their small size, low manufacturing cost, and accuracy.

In a further embodiment of the disclosure, a sensor array may be provided. The sensor array may include two or more of the above-described sensors. All of the sensors in the array may be the same, and for detecting the same gases. The additional sensors may be included to provide redundancy. Alternatively the sensors may be for detecting different gases.

In a further embodiment, an integrated circuit comprising one of the afore-mentioned sensors may be provided. Alternatively an integrated circuit comprising the above-described sensor array may be provided.

In the above-described embodiments, a 3-electrode system has been described. The disclosure is also applicable to 2-electrode systems and systems with more than 3 electrodes. Different numbers and combinations of electrodes can be used to detect different gases. Furthermore, in above-described embodiments, only one of the electrodes is exposed to environmental gases, through one set of microcapillaries. As an alternative, two or more of the electrodes may be exposed to environmental gases via two or more sets of microcapillaries.

In the above-described embodiments, generally the working electrode is porous. As an alternative, there may be two porous electrodes, and two openings may be provided in the insulating layer. A respective one of each porous electrode may be formed in a respective opening. The substrate may include two sets of microcapillaries, each one aligned with a respective opening in the insulating layer.

The above-described sensor has been described primarily in the context of gas sensing. However, the sensor may be used for liquid sensing.

Figure 17:
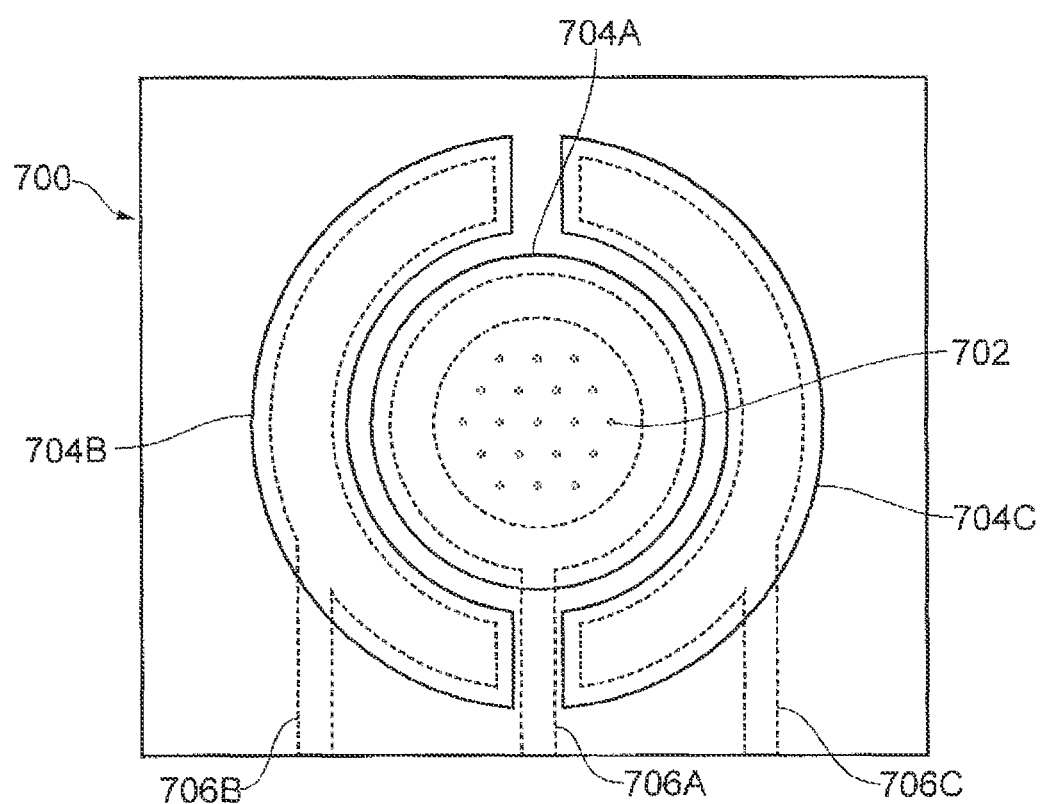
FIG. 17 is a top view of a sensor in accordance with a further embodiment of the disclosure.

FIG. 17 is a top view of certain components of a sensor 700 in accordance with a further embodiment of the disclosure. In this embodiment, the electrodes and the conductive tracks are annular or semi-annular. The construction of the various layers of the sensor 700 is the same as in the previous embodiments, and is not shown here in detail. The sensor 700 includes a plurality of capillaries 702 which are formed in a silicon substrate layer. The capillaries are formed in rows such that the outer capillaries roughly form a circle. The sensor also includes a working electrode 704A, a counter electrode 704B and a reference electrode 704C. The working electrode 704A is circular, and is arranged above the capillaries 702 such that the circle formed by the working electrode 704A is co-axial with the circle formed by the capillaries 702. The working electrode 704A has a diameter that is greater than the diameter of the circle formed by the capillaries 702, in order that sufficient space is provided to form connections with the conductive tracks.

The counter electrode 704B and the reference electrode 704C are both semi-annular in shape, and formed on either side of the working electrode 704A. The diameter of the inner edge of each of the semi-annular electrodes is slightly greater than the diameter of the outer edge of the working electrode, such that they may be insulated from the working electrode. A gap is also formed between the adjacent edges of the ends of each semi-annular portion, in order to ensure that the counter electrode 704B and the reference electrode 704C are insulated from each other.

An insulating layer and a passivation layer are formed between the electrodes and the silicon substrate. However, openings (not shown) are provided in these layers, in the same manner as the pervious embodiments, such that the working electrode 704A is in contact with the upper surface of the silicon substrate, in the area of the capillaries 702. Further openings are provided in the passivation layer (but not the insulating layer) to allow the electrodes to make contact with the conductive tracks, as described below.

The sensor 700 includes conductive tracks 706A, 706B and 706C. The conductive tracks are shown in broken lines, as they are all positioned below the passivation layer. Conductive track 706A is for connecting the working electrode 704A. The conductive track includes a ring-shaped portion, which is located around the capillaries 702, but within the outer edge of the working electrode 704A. The ring-shaped portion is co-axial with the working electrode 704A. A ring-shaped opening is formed in the passivation layer, and is aligned with the ring-shaped portion of the conductive track 706A, in order to allow the working electrode 704A to connect to the conductive track 706A. A rectangular connecting portion of track 706A is formed at the bottom edge of the ring-shaped portion, to provide a connection to external circuitry.

Conductive tracks 706B and 706C are formed partially underneath counter electrode 704B and reference electrode 704C respectively. Each track includes a semi-annular portion which is the same shape as the corresponding electrode, but slight smaller in size. As such, the semi-annular portions fit within the perimeters of their respective electrodes. Openings are provided in the passivation layer to enable the conductive tracks 706B and 706C to connect to the working electrode 704B and reference electrode, respectively. These openings are similar in size and shape to the semi-annular portions of the conductive tracks 706B and 706C. In a similar manner to the conductive track 706A, the conductive tracks 706B and 706C include rectangular portions which extend from an outer edge of the semi-annular portions to provide connections to external circuitry.

The purpose of using a circular and semi-annular arrangement is to reduce and optimise the distance and spacing between the electrodes. This reduces the resistance path between the electrodes, which can affect the sensor performance, including speed of response. For example, in a carbon monoxide sensor, there's ion movement, or transport, between the electrodes in the sensor. Ideally, therefore, the electrodes (including the entire electrode area) should be as close together as possible. Using circular and semi-annular electrodes makes this easier to achieve.

Figure 18:
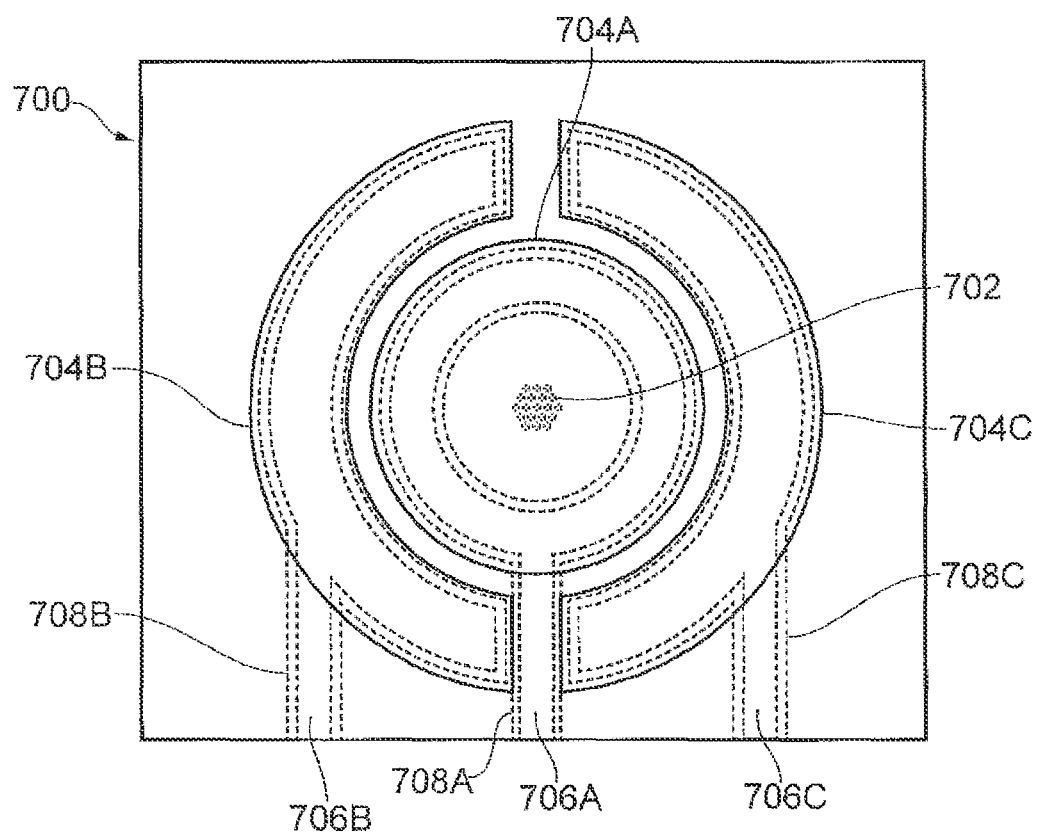
FIG. 18 is a top view of a sensor in accordance with a further embodiment of the disclosure.

FIG. 18 shows the sensor 700. In this embodiment, the sensor 700 includes all of the components shown in FIG. 17, and additionally includes shielding tracks 708A, 708B and 708C. The shielding tracks are formed around, but insulated from, the conductive tracks. The shielding tracks are also formed from conductive material. The shielding tracks are for shielding the sensor 700 from electromagnetic interference. The shielding tracks may be used with any of the above-described embodiments.

Figure 19:
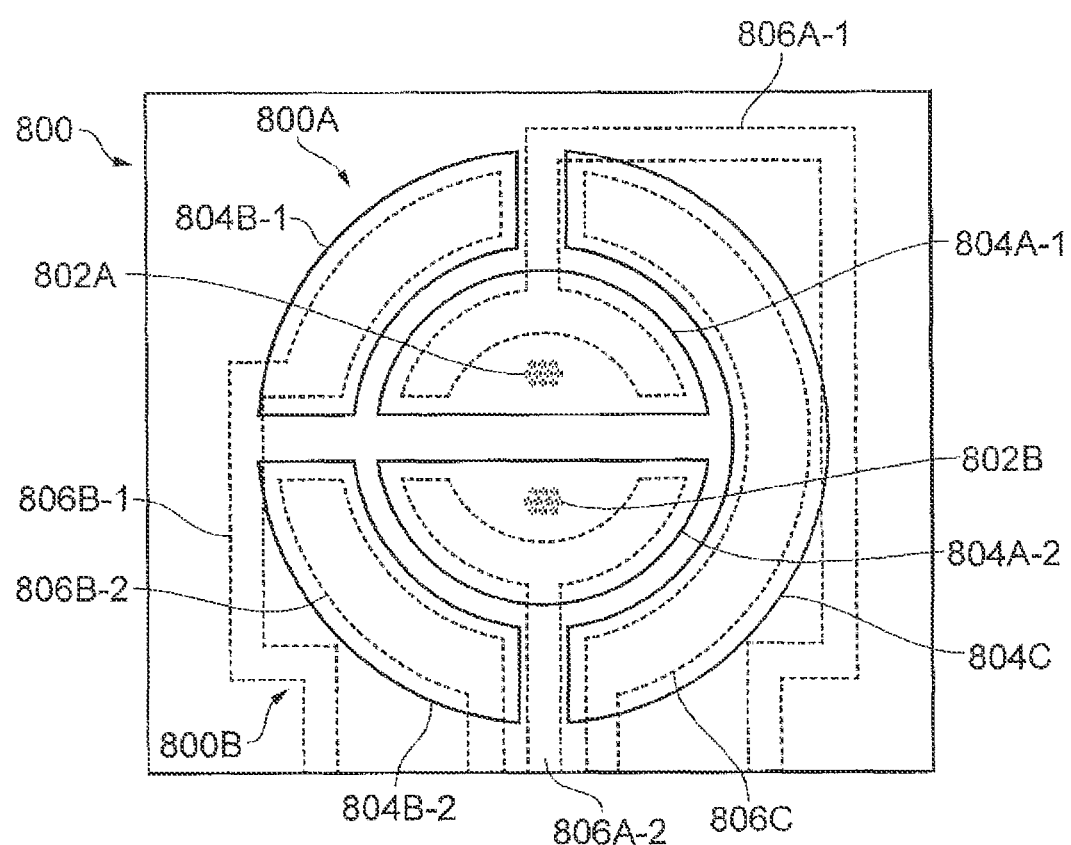
FIG. 19 is a top view of a sensor in accordance with a further embodiment of the disclosure.

FIG. 19 shows a sensor package 800 in accordance with a further embodiment of the disclosure. In this embodiment, the sensor package includes two sensors 800A and 800B. The working electrodes 804A-1 and 804A-2 are semicircular, rather than circular, and are positioned adjacent each other. Two groups of capillaries 802A and 802B are formed under each respective working electrode. Each working electrode is connected to a respective conductive track 806A-1 and 806A-2. The conductive tracks include semi-annular portions, corresponding to the semicircular electrodes, rather than ring-shaped portions.

The sensor package 800 also includes two counter electrodes 804B-1 and 804B-2. Each counter electrode corresponds to a respective one of the working electrodes and groups of capillaries. The counter electrodes are quarter-annular, rather than semi-annular. Each counter electrode is connected to a respective conductive track 806B-1 and 806B-2. The conductive tracks includes quarter-annular portions, rather than semi-annular portions, in a similar manner to the electrodes.

The sensor package includes a single reference electrode 804C, which is the same size and shape as the reference electrode 704C. The reference electrode is shared by both sensors 800A and 800B and is connected to conductive track 806C.

Alternatively, two separate reference electrodes may be used, in the same manner as the counter electrode. Additionally, both sensors share the same electrolyte, meaning no changes need to be made to the cap design.

Figure 20:
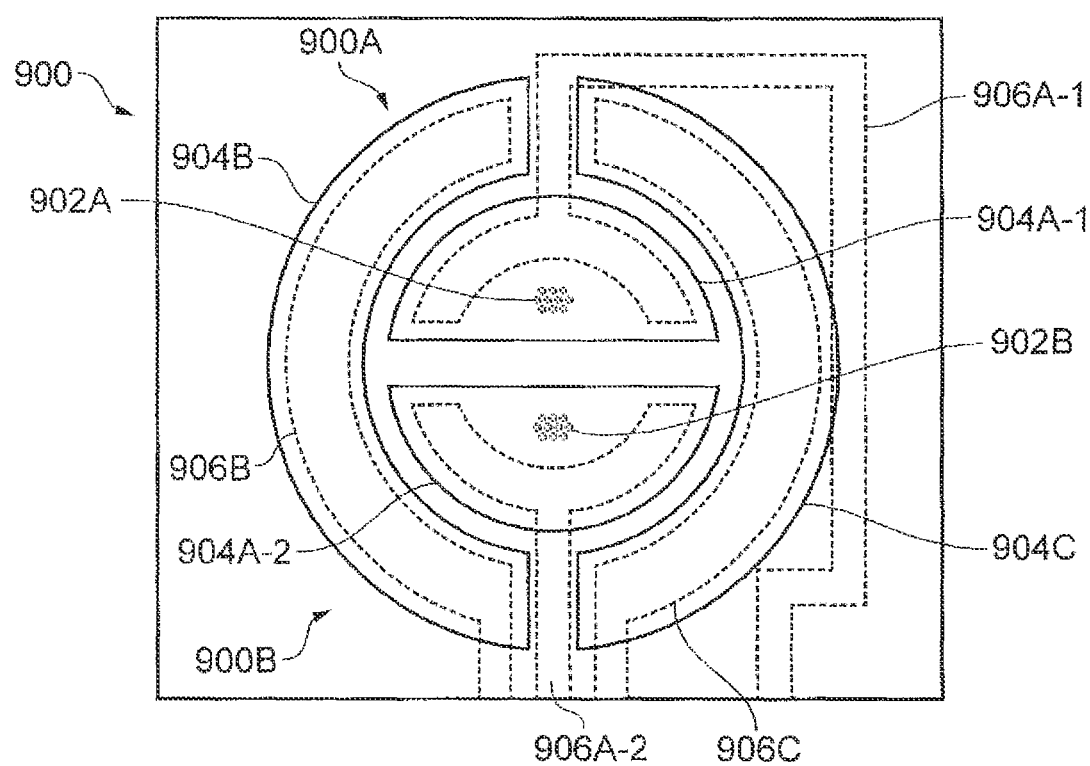
FIG. 20 is a top view of a sensor in accordance with a further embodiment of the disclosure.

FIG. 20 is a sensor package 900 in accordance with a further embodiment of the disclosure. Sensor package 900 is the same as sensor package 800 except for the counter electrodes. In sensor package 900, both sensors 900A and 900B share the same counter electrode 904B. Sensor package 900 also includes working electrodes 904A-1, 904A-2 and reference electrode 904C. The conductive tracks include two tracks 906A-1, 906A-1 for the working electrode, one track 906B for the counter electrode 904B, and one track 906C for the reference electrode 904C. While the above-described embodiments have been shown with two sensors in one sensor package, it will be appreciated that three or more sensors could be incorporated into a single sensor package, with appropriate changes to the design of the electrodes. By providing two sensors in a single package, applications which require multiple sensors can be provisioned using a single package, rather than using multiple packages. A multi-sensor package is smaller and more cost effective than using separate packages.

In the above-described embodiments, various different shapes have been used for the electrodes, conductive elements, and openings. Tt will be appreciated that the present disclosure is not limited to any of these shapes, although certain shapes do have particular advantages, as described above. Other shapes may fall within the scope of the claims.

The invention claimed is:

1. A method of manufacturing an electrochemical sensor, comprising:
   forming an insulating layer on a monolithic substrate including a capillary formed therein, the capillary extending between a first major surface of the substrate and a second major surface of the substrate;
   forming a passivation layer over the insulating layer;
   providing at least one hole in the substrate;
   providing an opening in the insulating layer and the passivation layer;
   forming at least one porous electrode in the opening in the insulating layer and passivation layer aligned with the capillary extending through the insulating layer and is formed in or adjacent the first major surface of the monolithic substrate in an area defined by the opening such that the at least one porous electrode is exposed to an environment through the substrate;
   forming at least one additional electrode over the insulating layer, wherein at least a portion of the at least one additional electrode is formed in a hole in the passivation layer to connect the at least one additional electrode to a conductive track; and
   forming a layer of electrolyte over the at least one porous electrode and the at least one additional electrode and the insulating layer.

2. The method according to claim 1, wherein providing the at least one hole in the substrate includes providing a single capillary.

3. The method according to claim 2, wherein providing the single capillary is done by photolithography.

4. The method according to claim 1, wherein providing the at least one hole in the substrate includes providing a plurality of microcapillaries.

5. The method according to claim 1, further comprising depositing a metal layer over the insulating layer to form conducting tracks.

6. The method according to claim 1, wherein forming the at least one porous electrode and forming the at least one additional electrode are done using at least one of screen printing, stencil printing, lithographic deposition, or aerosol jet printing.

7. The method according to claim 1, wherein forming the at least one porous electrode in the opening in the insulating layer comprises completely extending through the insulating layer and forming the at least one porous electrode in or adjacent the first major surface of the substrate in an area defined by the opening in the insulating layer.

8. The method according to claim 1, further comprising placing a cap over the electrochemical sensor.

9. The method according to claim 1, further comprising simultaneously forming a plurality of electrochemical sensors on the substrate.

10. A method of manufacturing an electrochemical sensor, comprising:
    forming an insulating layer on a substrate, the substrate having a first upper surface and a second lower surface and the insulating layer being formed on the first upper surface;
    providing a plurality of microcapillaries in the substrate, the plurality of microcapillaries extending from the first upper surface to the second lower surface;
    providing an opening in the insulating layer, the opening aligned with the plurality of microcapillaries and extending through the insulating layer;
    forming at least one porous electrode in the opening in the insulating layer, a portion of the at least one porous electrode being formed on the first upper surface of the substrate in an area defined by the opening in the insulating layer, and such that the at least one porous electrode is exposed to an environment through the substrate;
    forming at least one additional electrode, over the insulating layer;
    forming one or more conductive tracks over the insulating layer that extends onto a side-wall of the opening in the insulating layer and/or a side-wall of at least one hole formed in the substrate;
    forming a passivation layer over the insulating layer and the one or more conductive tracks; and
    forming a layer of electrolyte comprising a liquid solution, conductive polymer or hydrogel over the at least one porous electrode, the at least one additional electrode, and the insulating layer;
    forming a cap over the insulating layer, wherein the electrolyte is provided within the cap, and at least partially fills the cap; and
    forming at least one recess in the substrate, in communication with a space defined by the cap, wherein the electrolyte is also provided within the at least one recess.

11. The method of claim 10, wherein the at least one porous electrode is coupled to the at least one additional electrode by a respective conductive track of the one or more conductive tracks.

12. The method of claim 10, further comprising:
   forming a trench on an underside of the substrate to enable gases to reach the at least one hole from a side of the substrate.

13. The method of claim 10, further comprising:
   simultaneously forming a plurality of electrochemical sensors on the substrate.

\* \* \* \* \*